United States Patent
Yang et al.

(10) Patent No.: US 12,548,311 B2
(45) Date of Patent: Feb. 10, 2026

(54) TRAINING A NEURAL NETWORK USING A DATA SET WITH LABELS OF MULTIPLE GRANULARITIES

(71) Applicant: Motional AD LLC, Boston, MA (US)

(72) Inventors: Jiong Yang, Singapore (SG); You Hong Eng, Singapore (SG); Pan Yu, Singapore (SG)

(73) Assignee: Motional AD LLC, Boston, MA (US)

( * ) Notice: Subject to any disclaimer, the term of this patent is extended or adjusted under 35 U.S.C. 154(b) by 548 days.

(21) Appl. No.: 17/816,678

(22) Filed: Aug. 1, 2022

(65) Prior Publication Data
US 2023/0042450 A1    Feb. 9, 2023

Related U.S. Application Data

(60) Provisional application No. 63/229,335, filed on Aug. 4, 2021.

(51) Int. Cl.
*G06V 10/82*   (2022.01)
*B60W 50/02*   (2012.01)
(Continued)

(52) U.S. Cl.
CPC ......... *G06V 10/82* (2022.01); *B60W 50/0205* (2013.01); *B60W 60/00* (2020.02);
(Continued)

(58) Field of Classification Search
CPC ............ G06N 3/08; G06N 20/00; G06N 3/02; G06V 10/82; G06V 10/764; G06T 2207/20084; G06T 2207/20081
See application file for complete search history.

(56) References Cited

U.S. PATENT DOCUMENTS

| 6,023,302 A | 2/2000 | MacInnis et al. |
| 6,269,435 B1 | 7/2001 | Dally et al. |
| (Continued) | | |

FOREIGN PATENT DOCUMENTS

| CN | 111598900 A | * | 8/2020 | ........... G06N 3/0454 |
| CN | 112614571 A | * | 4/2021 | ......... G06K 9/00711 |
| (Continued) | | | | |

OTHER PUBLICATIONS

Leite et al., Evolving granular neural networks from fuzzy data streams, 2013, Neural Networks 38 (2013), pp. 1-16, doi.org/10.1016/j.neunet.2012.10.006.*

(Continued)

*Primary Examiner* — Guillermo M Rivera-Martinez
(74) *Attorney, Agent, or Firm* — Knobbe, Martens, Olson & Bear, LLP

(57) ABSTRACT

This disclosure describes systems and methods for training a neural network with a training data set including data items labeled at different granularities. During training, each item within the training data set can be fed through the neural network. For items with labels of a higher granularity, weights of the network can be adjusted based on a comparison between the output of the network and the label of the item. For items with labels of a lower granularity, an output of the network can be fed through a conversion function that convers the output from the higher granularity to the lower granularity. The weights of the network can then be adjusted based on a comparison between the converted output and the label of the item.

21 Claims, 11 Drawing Sheets

(51) Int. Cl.
*B60W 60/00* (2020.01)
*G06N 3/045* (2023.01)
*G06V 10/56* (2022.01)
*G06V 10/75* (2022.01)
*G06V 10/77* (2022.01)
*G06V 20/56* (2022.01)

(52) U.S. Cl.
CPC .......... *G06N 3/045* (2023.01); *G06V 10/56* (2022.01); *G06V 10/751* (2022.01); *G06V 10/7715* (2022.01); *G06V 20/56* (2022.01); *B60W 2050/021* (2013.01); *B60W 2050/0215* (2013.01); *B60W 2420/403* (2013.01)

(56) References Cited

U.S. PATENT DOCUMENTS

| | | |
|---|---|---|
| 6,970,595 B1 | 11/2005 | Park |
| 11,256,958 B1 | 2/2022 | Subbiah et al. |
| 11,334,762 B1 | 5/2022 | Wrenninge |
| 12,333,828 B2 | 6/2025 | Yu et al. |
| 2003/0058939 A1 | 3/2003 | Lee et al. |
| 2005/0134601 A1 | 6/2005 | Gottardo et al. |
| 2007/0201726 A1 | 8/2007 | Steinberg et al. |
| 2008/0157510 A1* | 7/2008 | Breed ............. B60R 21/01534 701/45 |
| 2009/0167922 A1 | 7/2009 | Perlman et al. |
| 2014/0119654 A1 | 5/2014 | Taylor et al. |
| 2014/0368669 A1 | 12/2014 | Talvala et al. |
| 2015/0348326 A1 | 12/2015 | Sanders et al. |
| 2016/0014347 A1 | 1/2016 | Eynde |
| 2016/0034786 A1 | 2/2016 | Suri et al. |
| 2016/0140424 A1* | 5/2016 | Wang ................ G06F 18/2414 382/156 |
| 2018/0189951 A1 | 7/2018 | Liston et al. |
| 2018/0322386 A1* | 11/2018 | Sridharan ............. G06F 9/54 |
| 2019/0025773 A1 | 1/2019 | Yang et al. |
| 2019/0058887 A1* | 2/2019 | Wang ................ G06V 20/46 |
| 2019/0073560 A1* | 3/2019 | Matei ................ G06N 3/08 |
| 2019/0156485 A1 | 5/2019 | Pfeiffer |
| 2019/0278994 A1* | 9/2019 | Bumpas ............ G06N 3/045 |
| 2019/0291727 A1 | 9/2019 | Shalev-Shwartz et al. |
| 2019/0339706 A1 | 11/2019 | Batur |
| 2020/0026956 A1* | 1/2020 | Kumar .............. G06F 18/2431 |
| 2020/0057442 A1* | 2/2020 | Deiters ............... G06V 20/58 |
| 2020/0074674 A1 | 3/2020 | Guo et al. |
| 2020/0089998 A1 | 3/2020 | Zagaynov et al. |
| 2020/0090322 A1 | 3/2020 | Seo et al. |
| 2020/0094784 A1* | 3/2020 | Herman ............. B60S 1/0848 |
| 2020/0134855 A1 | 4/2020 | Zucker et al. |
| 2020/0143171 A1 | 5/2020 | Lee et al. |
| 2020/0201351 A1* | 6/2020 | Armstrong-Crews ...................... B60W 30/18145 |
| 2020/0202168 A1 | 6/2020 | Mao et al. |
| 2020/0226403 A1 | 7/2020 | Evans |
| 2020/0241111 A1* | 7/2020 | Fetterman ............ G01S 7/412 |
| 2020/0285949 A1* | 9/2020 | Baum ................ G06N 3/04 |
| 2020/0342652 A1 | 10/2020 | Rowell et al. |
| 2021/0067676 A1 | 3/2021 | Wen et al. |
| 2021/0150363 A1* | 5/2021 | Yang ................ G06N 3/045 |
| 2021/0200235 A1 | 7/2021 | Shalev-Shwartz et al. |
| 2021/0200238 A1 | 7/2021 | Galoogahi et al. |
| 2021/0248788 A1 | 8/2021 | Imao |
| 2021/0258513 A1 | 8/2021 | Fieldman |
| 2021/0272288 A1 | 9/2021 | Takahashi et al. |
| 2022/0222932 A1* | 7/2022 | Zhang .................. G06V 20/695 |
| 2022/0391752 A1 | 12/2022 | Grant et al. |
| 2022/0405587 A1 | 12/2022 | Rangarajan et al. |
| 2022/0415030 A1 | 12/2022 | Hou et al. |
| 2023/0039935 A1 | 2/2023 | Yu et al. |
| 2024/0119746 A1 | 4/2024 | Liu et al. |
| 2024/0221197 A1 | 7/2024 | Furukawa |

FOREIGN PATENT DOCUMENTS

| | | |
|---|---|---|
| EP | 3540691 A1 | 9/2019 |
| EP | 3657379 A1 | 5/2020 |
| JP | 2985879 B1 | 12/1999 |
| JP | 2013-109455 A | 6/2013 |
| JP | 2019-201397 A | 11/2019 |
| KR | 10-2020-0049888 A | 5/2020 |
| KR | 10-2021-0042387 A | 4/2021 |
| KR | 10-2021-0084313 A | 7/2021 |
| KR | 10-2021-0092319 A | 7/2021 |

OTHER PUBLICATIONS

Chen et al., Understanding the Impact of Label Granularity on CNN-based Image Classification, 2019, Electrical and Computer Engineering Carnegie Mellon University, pp. 1-10, arXiv:1901.07012v1.*
Wang et al., Granular computing: from granularity optimization to multi-granularity joint problem solving, 2017, Granul. Comput. 2, pp. 105-120 (2017), doi.org/10.1007/s41066-016-0032-3.*
Cui et al., Measuring Dataset Granularity, 2019, pp. 1-13, arXiv:1912.10154v1.*
Din, N. U. et al., "Effective Removal of User-Selected Foreground Object from Facial Images Using a Novel GAN-Based Network", IEEE Access, Jun. 2020, vol. 8, pp. 109648-109661.
Li, C. et al., "Deep Supervision with Intermediate Concepts", IEEE Transactions on Pattern Analysis and Machine Intelligence, Aug. 2019, vol. 41, No. 8, pp. 1828-1843.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Great Britain Office Action issued for Application No. GB 2211259.3, dated Aug. 23, 2022.
Great Britain Office Action issued for Application No. GB 2211259.3, dated Jan. 30, 2023.
Great Britain Office Action issued for Application No. GB 2211257.7, dated Aug. 22, 2022.
Great Britain Office Action issued for Application No. GB 2211257.7, dated Jan. 23, 2023.
Korean Office Action issued for Application No. KR 10-2022-0097469, dated Apr. 16, 2024.
Korean Office Action issued for Application No. KR 10-2022-0097469, dated Dec. 30, 2024.
Korean Office Action issued for Application No. KR 10-2022-0097470, dated Aug. 29, 2025.
Korean Notice of Allowance received for KR Application No. 10-2022-0097469, mailed Nov. 24, 2025.
Korean Notice of Allowance received for KR Application No. 10-2022-0097470, mailed Nov. 24, 2025.

* cited by examiner

TRAINING A NEURAL NETWORK USING A DATA SET WITH LABELS OF MULTIPLE GRANULARITIES

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings. Full or partial blockage of one or more of these sensors can lead to degraded performance of the autonomous vehicle.

DETAILED DESCRIPTION

Figure 1:
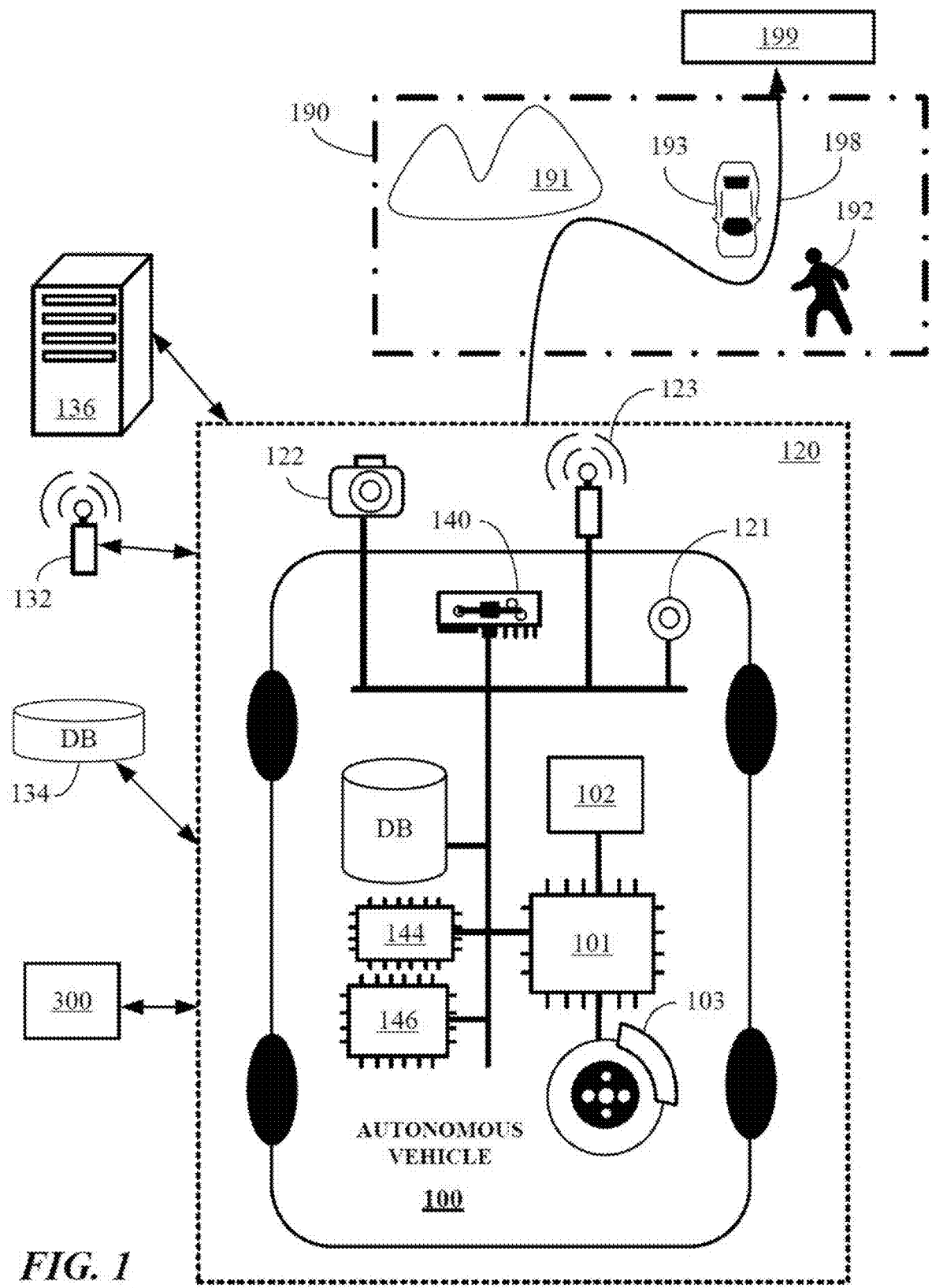
FIG. 1 shows an example of an autonomous vehicle having autonomous capability.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit)

processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

Generally described, aspects of the present disclosure relate to training a neural network to recognize camera blockages, such as objects adhered to a lens of an autonomous vehicle's camera. More specifically, aspects of the present disclosure relate to synthetically generating input data usable to train a neural network to detect boundaries of such blockages, as well as to training such a neural network using a combination of synthetically and non-synthetically generated data. As disclosed herein, synthetic input data for a camera-blockage-detection neural network may be generated by controlled generation of blockage images on a known background (e.g., of a known color), detection of blockage boundaries by analysis of the images based on the known background, and replacement of that known background with various other background images (e.g., real-world imagery) in order to generate synthetic blocked images with known blockage boundaries. This technique may generate more accurate synthetic block images than alternative techniques, while preserving an ability to accurate detect blockage boundaries. A neural network may then be trained based on both the synthetic blockage images having known blockage boundaries and non-synthetic blockage images (e.g., obtained from a production environment) having unknown blockage boundaries in order to generate a trained network that, given a non-synthetic blockage image, can generate expected blockage boundaries for the image. Thereafter, the trained network may be applied (e.g., in production) to detect camera blockages and estimated boundaries of such blockages. More accurate detection of blockages and boundaries may in turn result in more accurate and safer use of camera data, such as by enabling more accurate and safe operation of an autonomous vehicle.

As will be appreciated by one skilled in the art, accurate training of neural networks can often require large input data sets. In some cases, it may be difficult or impossible to obtain non-synthetic input data sufficient to train a network accurately. This may be particularly true for neural networks intended to deal with "edge case" scenarios that do not often occur. One example of such an edge case may be camera blockages in an autonomous vehicle, such as when water or other matter (e.g., leaves, mud, sand, etc.) adheres to a lens of a camera of the vehicle and prevents capture of the vehicle's environment. Such instances can pose significant safety concerns, particularly where the vehicles camera is used in whole or in part to control operation of the vehicle. While it may be trivial for a human operator to recognize such blockages and the extent of such blockages, it is more difficult to do so programmatically. Typically, camera images are analyzed as two-dimensional data (e.g., as a two-dimensional pixel matrix), and it may be difficult from a programmatic standpoint to accurate distinguish between pixels capturing a blockage and pictures capturing a vehicle's environment. One approach to training a computing device to programmatically distinguish blocked images from non-blocked images, and to detect the extent of such blockage, may be to train a neural network on inputs including both blocked and non-blocked images. However, the relative sparsity of blocked imagery—e.g., due to its nature as an edge case—may inhibit accurate training.

One technique to synthetically generate input data may be to use a neural network framework, such as a generative adversarial network (GAN). Such a framework may be trained (e.g., based on non-synthetic blocked images) to generate synthetic blocked images. However, this approach has a number of drawbacks. For example, the output of such a network may not be of sufficient quality to train a network for use in an autonomous vehicle on public roads. Moreover, even if such a network were able to provide synthetic data of sufficient quality, such a network would generally be unable to accurately indicate what portions of an image are blocked versus unblocked. However, the nature and extent of blockage may be important in various contexts, such as to the safe and accurate operation of an autonomous vehicle. For example, such a vehicle may continue to operate under minor blockage conditions (e.g., 1 to 2% blockage) while implementing responsive action (e.g., a lens cleaning apparatus), but may not operate as intended when major blockages (e.g., 75% or more) are present. Because GAN-generated synthetic images may not include data on which portions of an image are blocked, these images may be inappropriate for such applications.

Another possible technique to generate synthetic data may be to directly crop images of blockages from one background image and superimpose the cropped blockage image onto background images (e.g., of a vehicle's environment). For example, a non-synthetic image including blockage may be processed to isolate the blockage (e.g., by cropping out a background). That cropped blockage may then be superimposed on a non-blocked background image to generate a synthetic blocked image of the new background. Because the locations of the blockage are known, the image may be associated with blockage data indicating those locations. In this way, one non-synthetic image with blockage may be used to generate one or more synthetic images with the blockage. However, this "copy-and-paste" technique also has drawbacks. Specifically, such synthetic images may inaccurately reflect real-world blockages, due to interactions between the blockage and the background that are not captured via a crop-and-overlay operation. Illustratively, some blockages may be partially transparent, and thus only partly obscure a camera's sensor. This may be particularly true on the edges of a blockage. For example, even a fully opaque object may cause "feathering" around the object, where a camera's sensor can partially capture the background environment. A crop-and-overlay operation would generally be unable to capture such partial blockages.

Embodiments of the present disclosure address these issues by providing for synthetic generation of highly accurate input data representing camera blockages. Specifically, in accordance with embodiments of the present disclosure, a blockage object (e.g., a leaf, water, mud, etc.) may be captured against a known background, such as a "green screen" or other background of known color range. To facilitate capture, the blockage object may for example be adhered to a transparent object, such as a glass panel or the lens of a capturing camera. Chroma keying may then be used to remove the known background, resulting in an image that accurately captures the blockage (e.g., including partially transparent portions of the blockage). Thereafter, the blockage can be superimposed onto new backgrounds in order to generate synthetically blocked images. This mechanism provides benefits similar to the crop-and-overlay technique discussed above, such as the ability to determine (e.g., on a pixel-by-pixel basis) which portions of an image represent blockage and which represent an environment. However, the mechanism avoids the detriments of that crop-and-overlay technique. For example, the chroma keying mechanism enables capture of partially transparent blockages, such as by translucent objects or objects whose edges cause feathering. Thus, this synthetic image generation technique enables the generation of large volumes of highly accurate input data.

In addition to generation of synthetic blockage images, embodiments of the present disclosure further relate to training of a neural network to detect (e.g., on a pixel level) blocked portions of an image containing blockage. Often, in order to generate an output of a given type, a neural network must be trained with input of that type. Accordingly, to train a neural network to detect which portions of an image are blocked, it may be necessary to provide inputs including both images with blockage and information identifying which portions of the images contain the blockage. However, providing this information for non-synthetic images may be difficult or cumbersome. For example, providing this information may generally require a human to manually review each image and designate, at a given granularity, which portions of an image are blocked. This process can require significant time and may have limited accuracy, particularly as granularity increases. For example, humans may be unable to generate large volumes of accurate pixel-level image annotations indicating which portions of the image are blocked. As noted above, embodiments of the present disclosure can address this problem by providing for generation of synthetic blocked images and corresponding indications (sometimes referred to as annotations) of which portions (e.g., which pixels) are blocked. However, it may not be desirable to train a neural network solely on such synthetic images. For example, there may be subtle differences between synthetic and non-synthetic images that reduce the accuracy of the trained network during application to non-synthetic inputs.

To address this, embodiments of the present disclosure provide for a neural network architecture that can be trained to generate highly accurate (e.g., pixel level) annotations for non-synthetic images containing blockage using as input data a combination of synthetic and non-synthetic images. More specifically, a machine learning architecture is described herein in which both synthetic and non-synthetic images are input into a neural network in order to generate indications (e.g., on a pixel-by-pixel basis) of which portions of the images are blocked. The input synthetic images may be accompanied by annotations indicating which pixels are blocked (if any), and thus when training on the basis of a synthetic image, the neural network may be trained based on a loss between the indications generated by the neural network and the annotations. The input non-synthetic images may lack annotations indicating which pixels are blocked, and instead be associated with binary blockage labels (e.g., blocked or unblocked). For training on the basis of such binary-labeled input data, the network may include a conversion function that converts an indication of which portions are blocked into a binary indicator of whether a block exists. For example, the conversion function may be a threshold function that generates a binary "blocked" indicator when a threshold percentage of the image (e.g., n %) is blocked. For inputs including binary-labeled input data, the neural network may then be trained by processing the input data to generate indications of which portions are blocked, converting the indications into a binary output via the conversion function, and comparing the binary output to a binary label for the input. In this manner, the network may be trained based on a combination of both binary-labeled data (e.g., non-synthetic data) and more granularly annotated data (e.g., synthetic data with pixel-level annotations). The model resulting from such training may thus be enabled to obtain new input data and determine annotations indicating which portions of the image (e.g., which pixels) are blocked. As a result, such a model may provide for highly accurate blockage detection in various scenarios, such as autonomous vehicles.

As will be appreciated by one of skill in the art in light of the present disclosure, the embodiments disclosed herein improve the ability of computing systems, such as computing devices included within or supporting operation of self-driving vehicles, to detect and characterize blockages of cameras. This detection and characterization, in turn, provides for more accurate, safe, and reliable operation of devices that use camera images as inputs. For example, an autonomous vehicle may be enabled to detect blockage on a camera and take corrective action commensurate with the extent of blockage detected. Moreover, the presently disclosed embodiments address technical problems inherent within computing systems; specifically, the difficulty of training a neural network with limited data, the difficulty of generating highly accurate synthetic data with granular (e.g., pixel-level) blockage annotations, and the difficulty of training a neural network to provide accurate and granular blockage annotations to non-synthetic images containing partial blockages. These technical problems are addressed by the various technical solutions described herein, including the generation of synthetic images using images of partial blockage on a known background and application of chroma keying techniques to apply the partial blockages to additional backgrounds and the training of a machine learning model on a combination of binarily-annotated (e.g., non-synthetic) and more granularly-annotated (e.g., synthetic) images. Thus, the present disclosure represents an improvement in computer vision systems and computing systems in general.

The foregoing aspects and many of the attendant advantages of this disclosure will become more readily appreciated as the same become better understood by reference to the following description, when taken in conjunction with the accompanying drawings.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to a second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
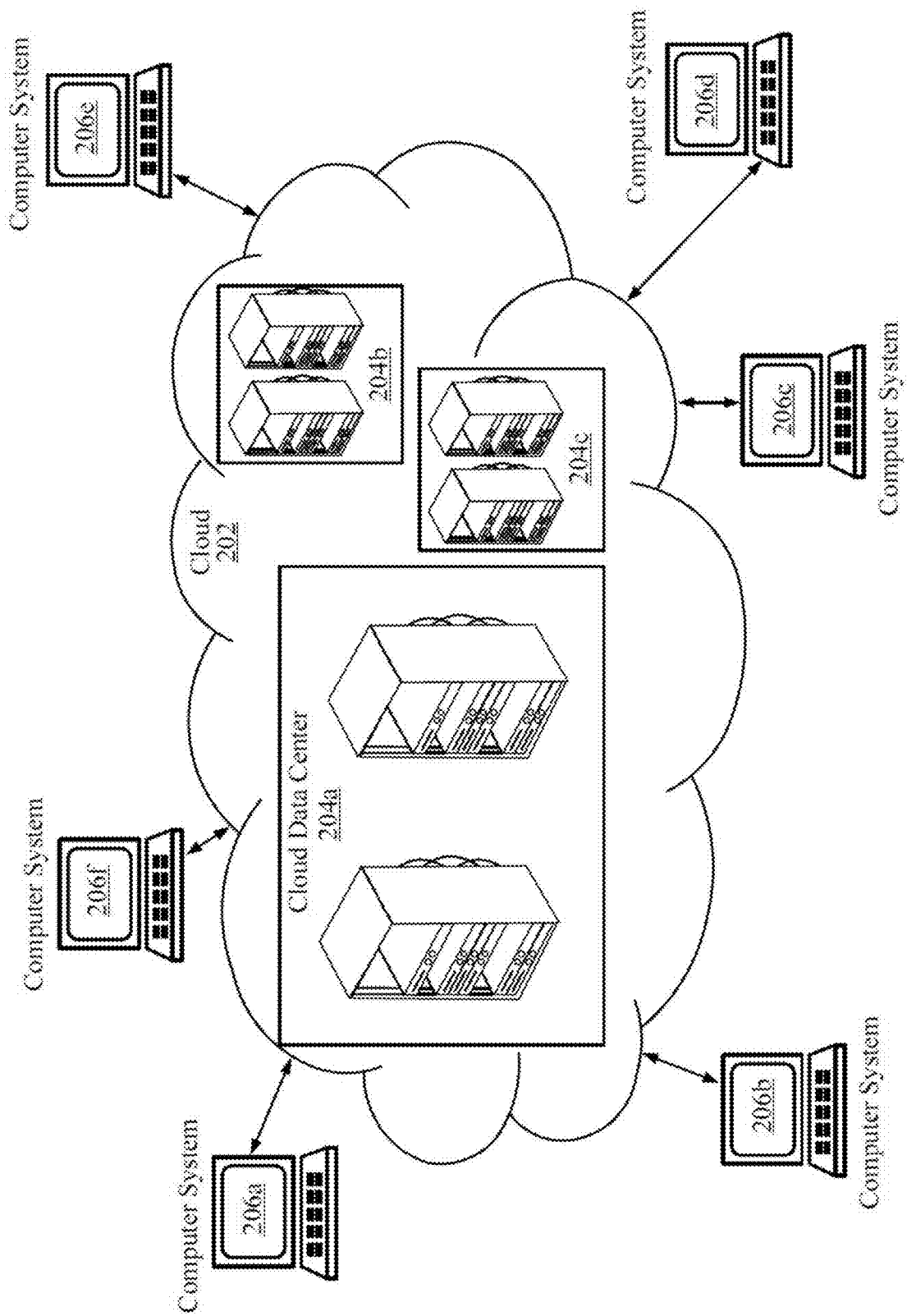
FIG. 2 shows an example cloud computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
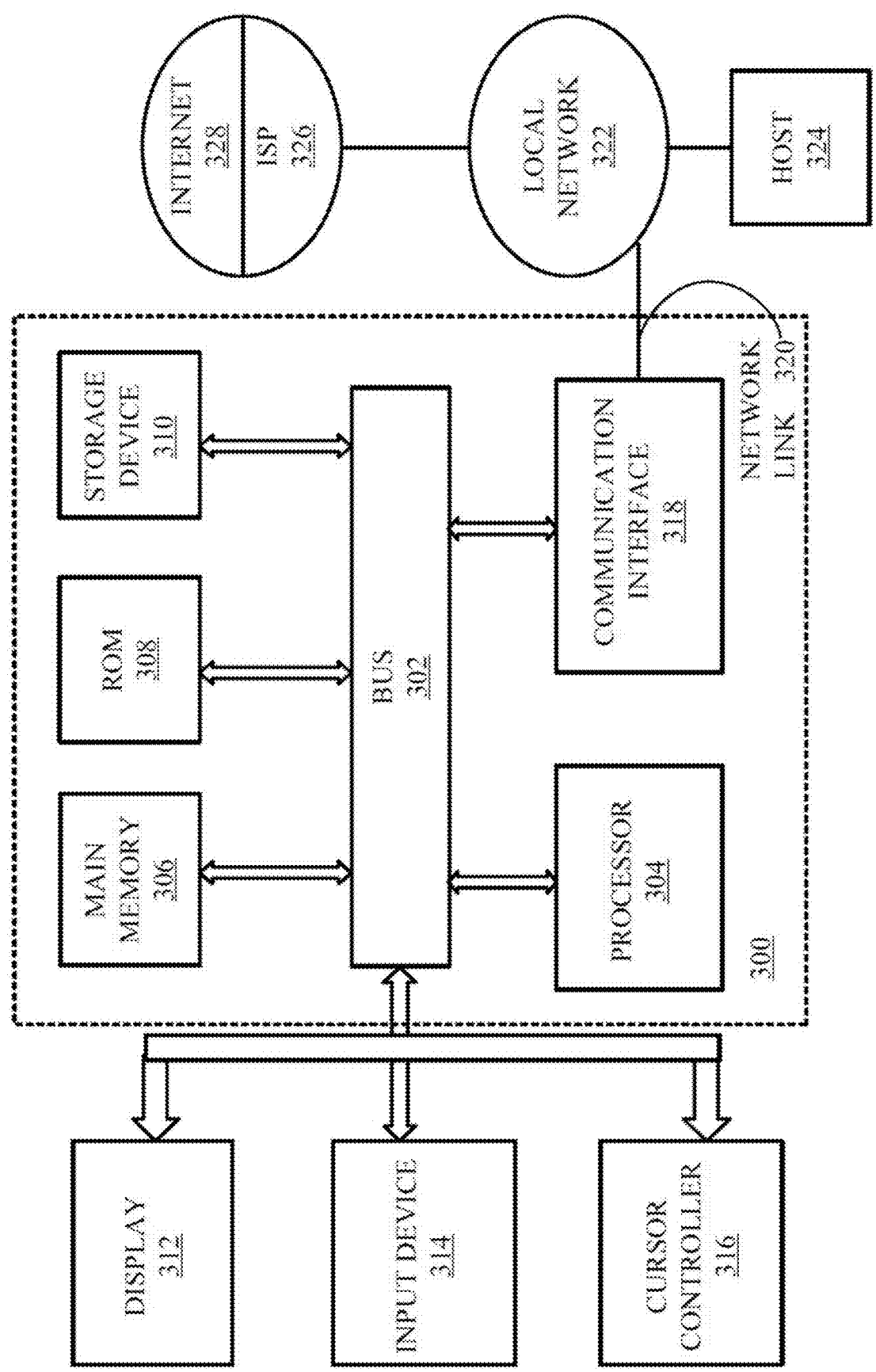
FIG. 3 shows a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
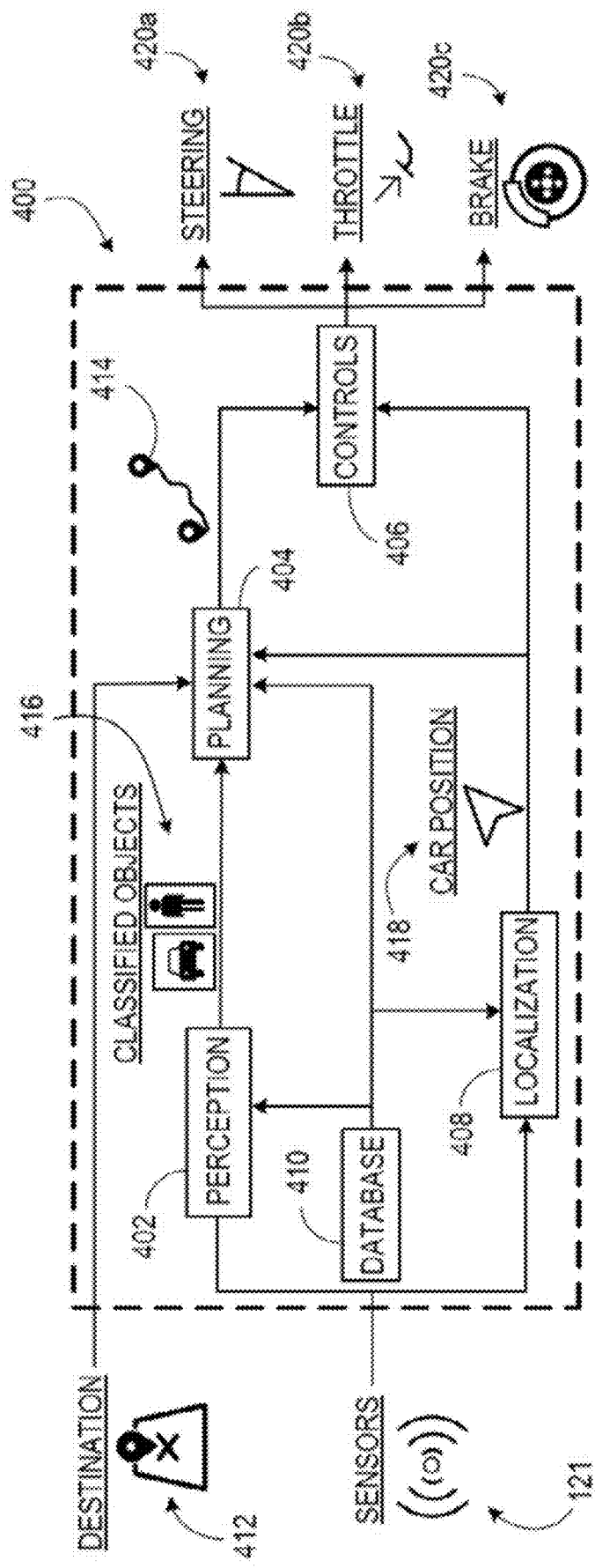
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
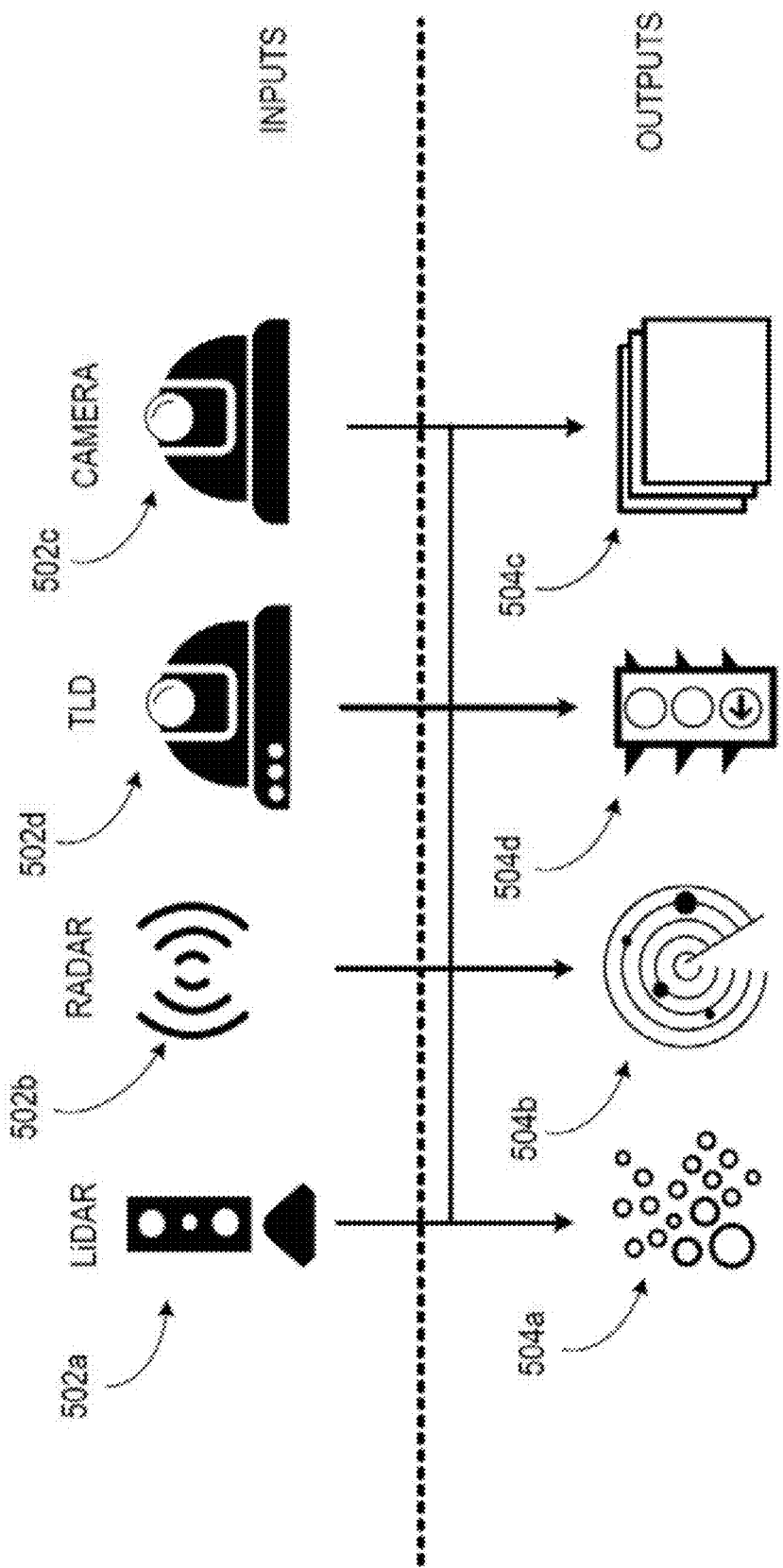
FIG. 5 shows an example of inputs and outputs that can be used by a perception module.

FIG. 5 shows an example of inputs 502a-d (e.g., sensors 121 shown in FIG. 1) and outputs 504a-d (e.g., sensor data) that are used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504*a-d* are combined using a sensor fusion technique. Thus, either the individual outputs 504*a-d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Sensor Blockage Detection

As noted above, one issue that may occur when relying on output of a 2D sensor, such as a camera 502*c*, is blockage—where dust, water, fog, debris, or other matter adheres to a lens or housing of the camera, or otherwise interferes with the sensor capturing a 2d image of the sensor's surroundings. In the context of autonomous vehicles, such blockage may represent a significant safety concern. Accordingly, it is beneficial to detect and address such blockage. Moreover, knowledge of the nature and extent of such blockage may be beneficial to determine an appropriate corrective action. For example, significant blockage may require an immediate halt to vehicle operation, whereas insignificant blockage may result in other corrective action (e.g., engaging a lens cleaning apparatus, slowing the vehicle, etc.) or a determination that the vehicle can continue to operate safely despite the insignificant blockage.

Figure 6A:
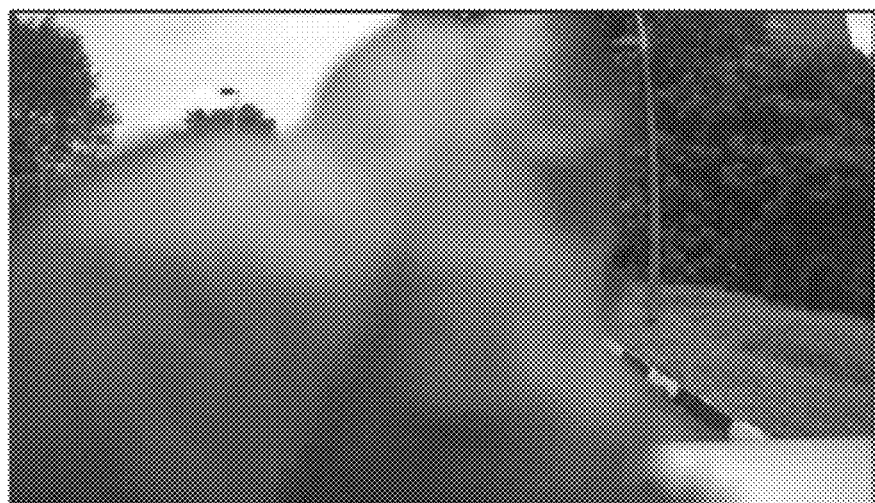
FIGS. 6A-6C show examples of how debris can at least partially block a field of view of an optical sensor.
Figure 6B:
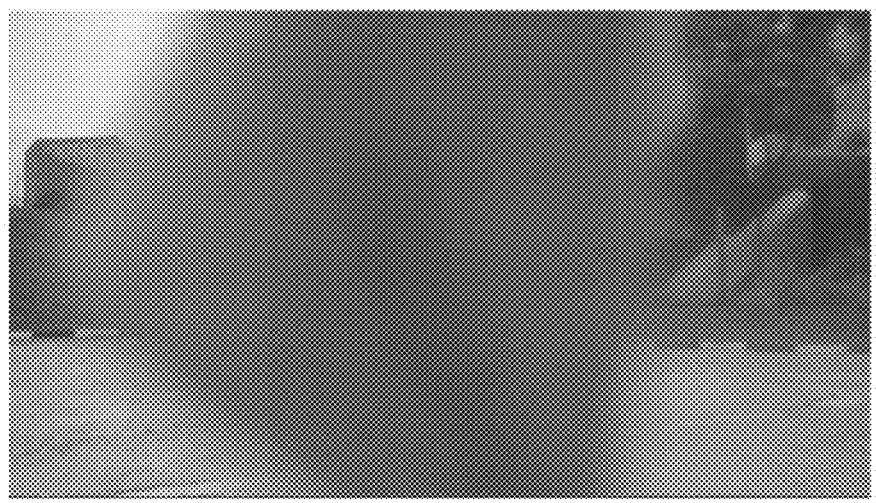
Figure 6C:

FIGS. 6A-6C show examples of how debris can at least partially block a field of view of an optical sensor. FIG. 6A shows an exemplary imagery collected by an optical sensor of AV 100 while a leaf partially blocks the field of view of the optical sensor. In FIG. 6A, the leaf is stuck to a sensor window associated with the optical sensor. This blockage might end after a shift in the wind or even in response to the car stopping, but it still can have an impact on the ability of AV 100 to monitor its surroundings for however long the blockage lasts. The imagery in FIG. 6A shows the leaf only slightly out of focus. This may be the case when the optical sensor has a very large depth of field or when a curvature of the leaf prevents the leaf from being blown flat against the sensor window associated with the optical sensor.

FIG. 6B shows another example in which the road debris is so close to the optical sensor that only a periphery of the road debris is clearly distinguishable. This can be the case where the road debris has a flat or flattened surface against the sensor window such that it becomes difficult to characterize the road debris. Generally, due to the large depth of field of the optical sensor, objects will only appear this blurry when in contact with the sensor window.

FIG. 6C shows another example in which the road debris takes the form of a plastic bag. In this case, even though the plastic bag covers a large portion of the field of view of the optical sensor, useful imagery can still be received through at least some covered portions of the imagery. For this reasons, it can be beneficial for a blockage detection system not only to characterize what portions of the image are blocked but whether any part of the blocked portions are at least partly transparent and thus still capture relevant information.

As discussed above, while humans may be readily able to infer from the examples of FIGS. 6A-C that blockage has occurred, it may be more difficult for a computing device to do so. That is, a computing device may generally (e.g., without sufficient specialized programming) be unable to distinguish between the blockage examples of FIGS. 6A-C and camera images taken without blockage. One approach to enabling a computing device to distinguish examples with blockage from those without blockage is to utilize machine learning techniques. However, these techniques typically require large volumes of data in order to generate an accurate machine learning model. Blockage, in practice, may be a relatively infrequent occurrence, and thus it may be difficult to use solely non-synthetic imagery to train such a model.

Figure 7:
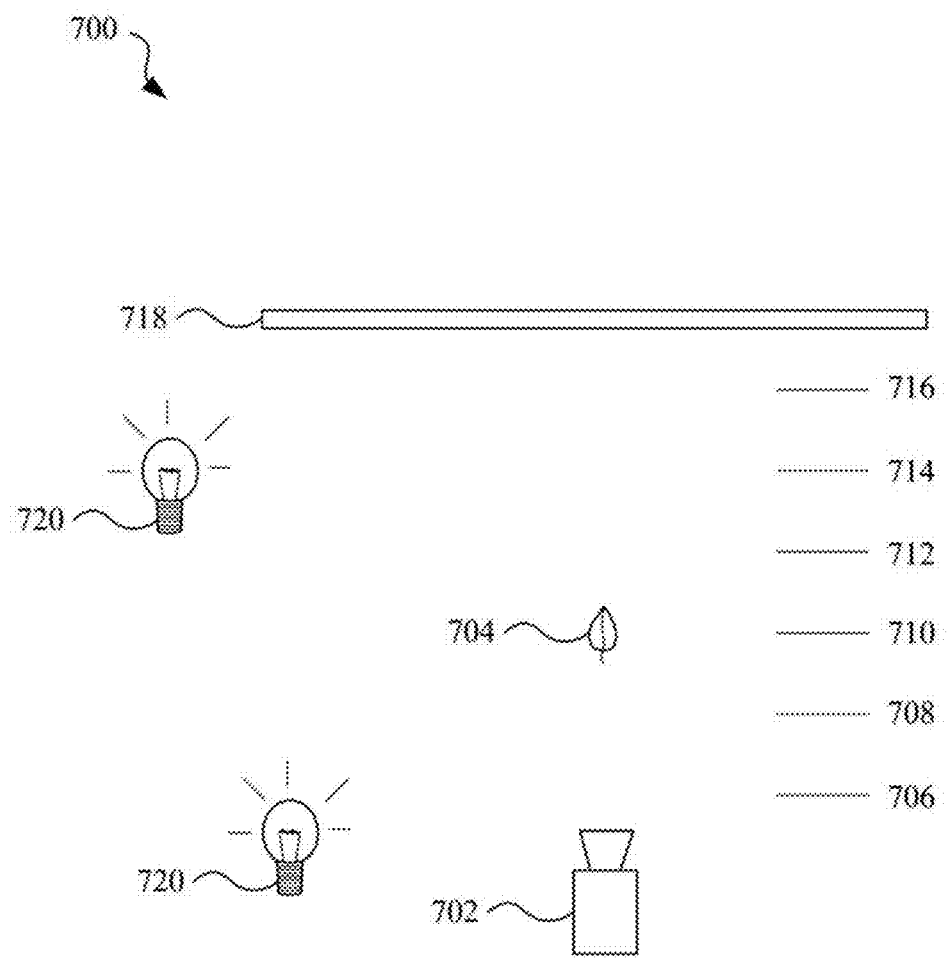
FIG. 7 shows a system for capturing imagery of various types of debris at different distances from an optical sensor.

Embodiments of the present disclosure address these issues by providing for synthetic generation of highly accurate input data representing camera blockages. Specifically, in accordance with embodiments of the present disclosure, a blockage object (e.g., a leaf, water, dirt, etc.) may be captured against a known background, such as a "green screen" or other background of known color range. FIG. 7 shows an example system 700 for capturing an image of a blockage object against such a background. In FIG. 7, the blockage object is an item of road debris 704, while the background is a chroma key background 718. An image of the road debris 704 can be captured by an optical sensor 702. The location of the road debris 704 and/or the sensor 702 may be varied, such as to capture imagery of various types of road debris 704 at different distances from an optical sensor 702. In some embodiments, the distances can be marked off by indicia 706-716 to assist with positioning road debris 704 at consistent distances from optical sensor 702. In one embodiment, road debris 704 is suspended in front of the chroma key background 718 by a fishing line or other support structure unlikely to be captured by optical sensor 702. The support structure may have the same or similar color as chroma key background 718 to make its removal from images easier. In another embodiment, road debris 704 is adhered to a transparent medium, such as a window, or directly adhered to the sensor 702 (e.g., on a lens or housing of the sensor). Chroma key background 718 can take many forms including that of a blue screen or a green screen. Chroma key background 718 allows imagery of road debris 704 to be extracted from its background and makes it easier to perform analysis showing a transparency of various portions of the imagery of the road debris. For example, in the case road debris 704 takes the form of a plastic bag similar to the one depicted in FIG. 6C, an intensity or amount of the color of the chroma key background 718 shining through the plastic bag allows for an accurate determination of the transparency of the plastic bag. While only a single piece of road debris 704 is depicted it should be appreciated that in some embodiments, multiple pieces of road debris 704 can be imaged at once to show a configuration in which multiple objects are blocking the field of view of the optical sensor. While road debris 704 is one example of blockage, others are possible. For example, a transparent window showing water droplets, mud splatter, condensation, or the like may be used in the configuration of FIG. 7 in addition or alternatively to road debris 704.

FIG. 7 also shows how system 700 can include one or more light sources 720, which may be moved relative to the road debris 704 and/or the sensor 702. This allows system 700 to more accurately model the illumination of road debris in a broader variety of circumstances. Having control over lighting variation can help to provide a wider variety of appearances for the road debris given that lighting can have a large effect on the appearance of the road debris. For example, road debris with back lighting can have a very different appearance and/or transparency depending on the lighting source/location. A back-lit plastic bag could have a different transparency depending on the lighting. Lighting can also be used to simulate the effect of the sun being present within the field of view of the optical sensor.

Figure 8:
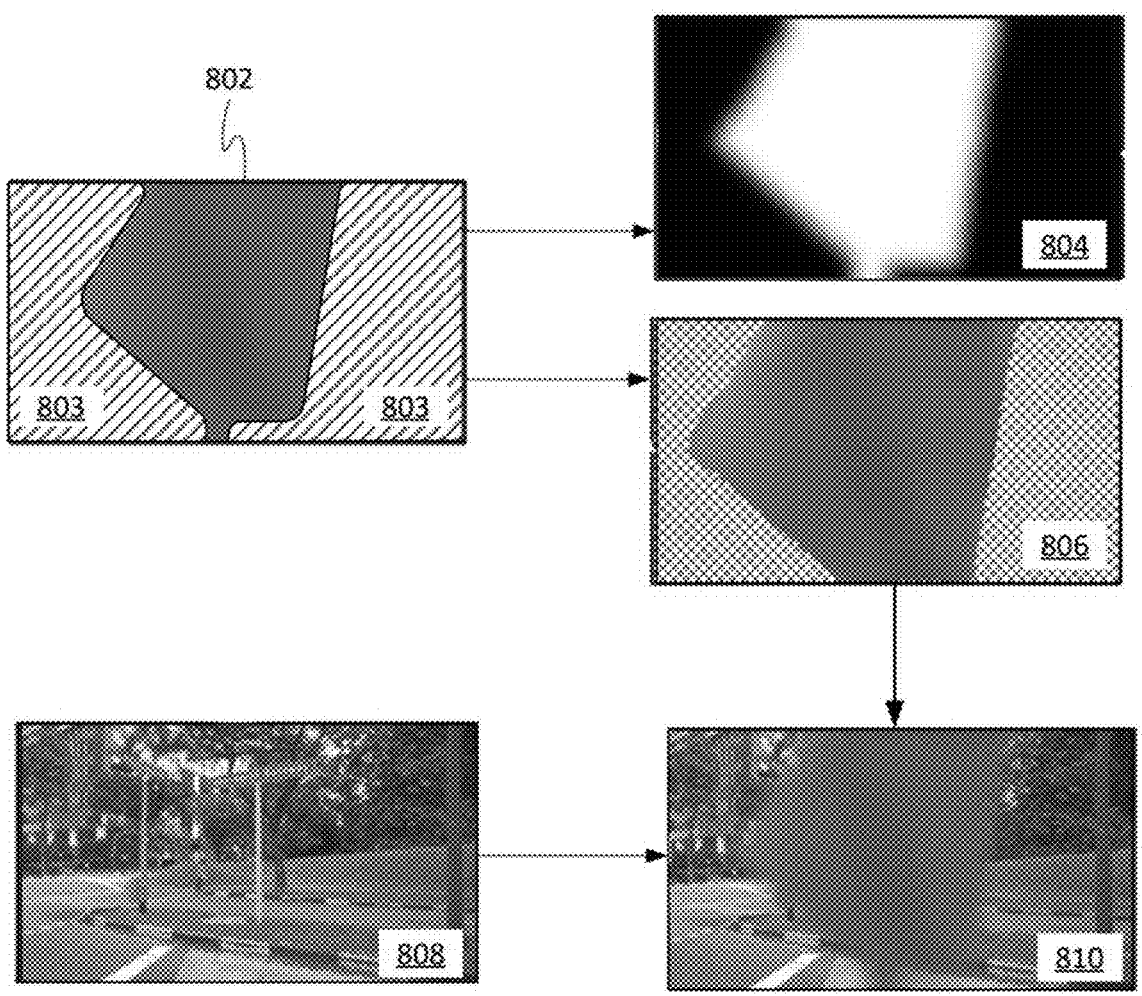
FIG. 8 shows how imagery generated by the system depicted in FIG. 7 can be used to synthesize imagery for training a neural network.

FIG. 8 visually illustrates a process for combining data extracted from a partial blockage image 802 captured by system 700 with a separate background image 808 (e.g., as captured by a sensor of a vehicle absent blockage) to generate synthetic input data suitable for training a neural network. The process of FIG. 8 may be implemented, for example, by the computing system 300 of FIG. 3.

In FIG. 8, the image 802 includes imagery of the road debris on a solid color background 803 (e.g., corresponding to the chroma key background 718). The imagery of the road debris can be extracted from the single color background 803 by performing a chroma keying operation. The various parameters for the chroma keying operation may be set according to the specifics of the image 802. For example, the threshold transparency value for separating the road debris from the background may be set to a sufficient high value to accurately remove the background 803 (e.g., 90%, 95%, 97%, 98%, 99%, etc.). The chroma keying operation can produce a mask 804 showing the blocked portions of the optical sensor's field of view (corresponding to the road debris depicted in the image) in white and the unblocked portions of the optical sensor's field of view in black. Mask 804 can take the form of an RGB or binary mask. The chroma keying operation also allows the transition between the white and black regions to be well defined illustrating a gradual change in the transparency of the debris at its edges. The chroma keying operation can also allow for the creation of a texture layer 806 representing the portion of the image 803 constituting road debris. This texture layer 806 can thus be used to fill the white portion of mask 804 to result in an image including the road debris but excluding the background color 803. It should be noted that the checkered portion of texture layer 806 is representative of transparent portions of texture layer 806. In some embodiments, the extracted pixels of the road debris object can be increased to place the periphery of the extracted pixels outside of the white area of mask 804. Increasing the size of the road debris in texture layer 806 can be performed to help prevent the inclusion of any color fringing along the periphery of the road debris object resulting from the chroma key background. In some embodiments, the image of the road debris, either prior to or subsequent to removal of the background color 803, can be rotated by varying amounts to provide more variation in the datasets prior to proceeding with a chroma keying operation. For example, image 802 could be radially offsets by between 1 and 15 degrees to produce a large number of blockage imagery from a single image. In some embodiments, where multiple images of road debris are to be added to a synthesized image different road debris pieces can be rotated by different amounts.

Texture layer 806 can be combined with mask 804 and overlaid upon background image 808 to produce synthesized training image 810. Background image 808 may represent an appropriate background that might otherwise be captured in a non-synthesized blocked image. For example, background image 8008 may be captured by an optical sensor on AV 100 and thus represent an environment of the AV 100. Background image 808 can include imagery of streets, highway and/or traffic intersections. To increase accuracy of synthesized images, the image sensor used to capture background image 808 may be the same or similar to optical sensor 702 used to capture the road debris or blockage items.

In some embodiments, mask 804 can be stored as metadata with synthesized training imagery 810. For example, the mask 804 may be used a pixel level blockage annotation since mask 804 dictates which pixels of the resulting synthesized image 810 are blocked and which are not blocked by the road debris. In some embodiments, an image level blockage annotation can be created as part of the synthesized image generation. The image level blockage annotation is a binary value indicating whether the imagery 810 constitutes a "blocked" image. In one embodiment, the binary value is indicative of whether an amount of the field of view being blocked exceeds a predetermined threshold value. As discussed below, the blockage threshold value may be set according to the operational requirements for training a machine learning model. For example, the threshold may be set in an attempt to match a human operators evaluation of whether an image includes significant blockage. Significant blockage, in turn, may depend at least in part on a use of the imagery. For example, a threshold may be lower for optical sensors that are more crucial to autonomous navigation of AV 100 as more minor blockages can have a greater effect on operation of AV 100. In one embodiment, the threshold is set at one or more of 50 percent, 60 percent, 70 percent, 80 percent, or 90 percent.

While FIG. 8 depicts the generation of a single synthetic image 810, the process of FIG. 8 may be repeated multiple times to generate a sufficient number of synthetic images 810 for accurate training of a machine learning model. For example, a device 300 may be provided with or configured to generate a wide variety of background images 808, such a via extraction of such images from sensor data during operation of an AV 100. Similarly, the device 300 may be provided with multiple images 802 including blockage objects on a known background 803. Each different combination of image 802 and image 808 may result in a different synthetic image 810, thus enabling rapid generation of large volumes of synthetic images 810. For example, combination of 100 images 802 with blockage objects and 10,000 background images 808 would result in one million distinct synthetic images 810. Programmatic alteration of the images 802, such as rotation of the blockage object into multiple orientations, would further increase this number. Accordingly, the process of FIG. 8 can enable ready generation of large volumes of synthetic images 810, enabling training of highly accurate machine learning models.

As noted above, while the process of FIG. 8 can provide for highly accurate synthetic image generation, it may not be desirable in all cases to train a machine learning model based solely on synthetic images. For example, such training may result in overfitting, whereby a machine learning model identifies peculiarities in synthetic images that are not present in non-synthetic images, thus enabling highly accurate detection of blockage in synthetic images without accurate detection of blockage in non-synthetic images. As the goal of the model may be to detect blockage in non-synthetic images, this is an undesirable outcome.

To address this, embodiments of the present disclosure can provide for training of a machine learning model on the basis of both synthetic and non-synthetic images, thereby avoiding overfitting to synthetic images without the detrimental lack of data that results from training without synthetic data. In one embodiment, a neural network machine learning model is used, and trained to detect which portions (e.g., pixels) of an image are blockage, and which portions are not (e.g., reflect an environment of a sensor aside from blockage). To train a neural network to detect which portions of an image are blocked, it may be necessary to provide inputs including both images with blockage and information identifying which portions of the images contain the blockage. As noted above, the processes disclosed herein can enable rapid generation of such information for synthetic images. However, providing this information for non-synthetic images may be difficult or cumbersome. For example, providing this information may generally require a human to manually review each image and designate, at a given granularity, which portions of an image are blocked. This process can require significant time and may have limited accuracy, particularly as granularity increases. Accordingly, human-classified images, such as non-synthetic images, may have less granular blockage information than synthetic information, where blockage information may be directly determined during synthesis. For example, human classified images may have binary blockage indicators (e.g., blockage is or is not present), or low granularity indicators (e.g., blockage present in a given quadrant) relative to synthetic images.

Figure 9:
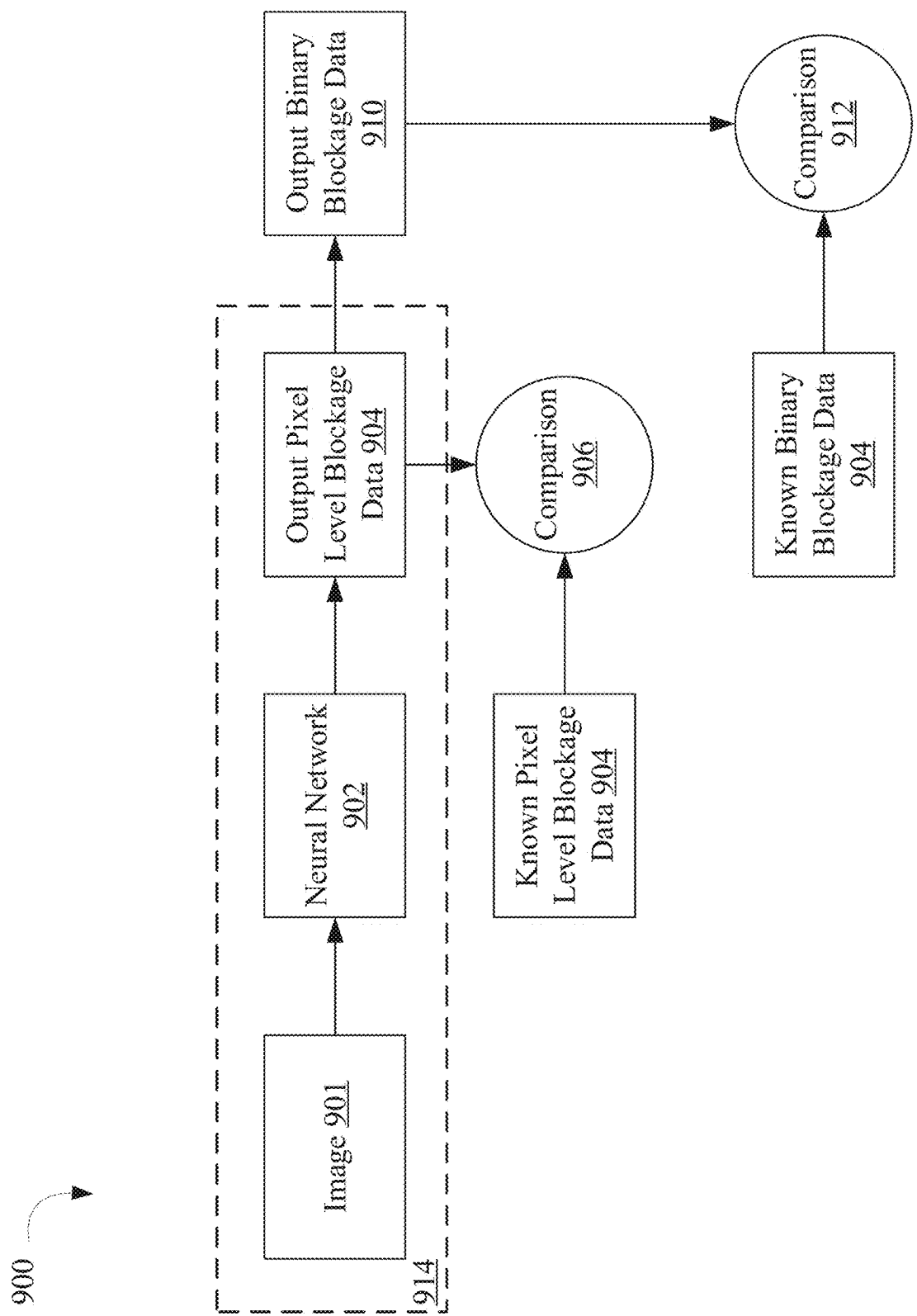
FIG. 9 shows a neural network training architecture for training a neural network to detect and characterize optical sensor blockages.

To address this, embodiments of the present disclosure provide for a neural network architecture that can be trained to generate highly accurate (e.g., pixel level) annotations for non-synthetic images containing blockage using as input data a combination of images with high granularity blockage information (e.g., at a pixel-by-pixel level) and images with low granularity blockage information (e.g., a binary blockage indicator). An example of such an architecture is shown in FIG. 9 as neural network training architecture 900. The architecture 900 may be implemented, for example on a device 300 described in FIG. 3. All or a portion of the architecture 900 may further be implemented on an autonomous vehicle, such as AV 100 of FIG. 1 (e.g., via computer processors 146). For example, the architecture 900 may be implemented on a device 300 external to an AV 100 for training purposes, and a portion of the architecture 900, such as the blocks surrounded by dashed lines 914, may after training be implemented within an AV 100 to conduct inference against non-synthetic input data (e.g., to control operation of the AV 100).

As shown in FIG. 9, the neural network training architecture 900 includes a neural network 902 configured to obtain, as input, data corresponding to an image 901, process the data according to the neural network 902, and output pixel level blockage data 904 for the input data. The image 901 may, for example, be a synthetic image generated via the process of FIG. 8. Alternatively, the image 901 may be a non-synthetic image, e.g., captured during operation of an AV 100. Processing within the neural network 902 may include a variety of operations in order to transform the input into corresponding pixel level blockage data 904. For example, the neural network 902 may be a convolutional neural network, in which image data is passed through one or more convolutions in order to extract features from the image data. The neural network 902 may further include one or more hidden layers (e.g., fully connected layers), in which features of the image data are multiplied by weights of individual nodes within hidden layers in order to potentially activate the nodes, with the hidden layers connected to an output layer that indicates, e.g., whether each pixel corresponds to a blockage.

Initially, the neural network 902 may be untrained. As such, the output pixel level blockage data 904 generated by the architecture 900 in its initial state may have low accuracy (e.g., no better than chance). Accordingly, images 901 with known blockage information may be passed through the network 902 in order to train the network 902, enabling characteristics of the network (e.g., the convolutions and/or weights of hidden layers) to be set in a manner that causes an output of the network 902 (the pixel level blockage annotations 904) to match known blockage information.

In the case of an image 901 with known pixel-level blockage data 904, training may occur directly from such known pixel-level blockage data 904. Illustratively, where the image 901 is a synthetic image generated by the process of FIG. 8, the image 901 may be accompanied by known pixel level blockage annotation data 907 (e.g., corresponding to mask 804), which indicates on a pixel-by-pixel basis whether a pixel corresponds to blockage (and, potentially, the transparency of such blockage). The output pixel level blockage information 904 generated by the neural network 902 for the image 901 may thus be compared with the known pixel level blockage data 907, shown in FIG. 9 as comparison 906 (which may represent, for example, a loss function), in order to adjust the neural network 902 (e.g., via back propagation) such that the output pixel level blockage information 904 more closely matches the known pixel level blockage data 907.

As discussed above, training solely based on synthetic images may not be desirable and may lead to disadvantages such as overfitting. Moreover, non-synthetic data may not include annotations as granular as synthetic data. For example, such non-synthetic data may have only known binary blockage annotations 908. Accordingly, the architecture 900 further enables training based on image data without known pixel level blockage annotation data 905, such as non-synthetic image data manually tagged as including or not including blockage. In the architecture 900, data representing images 901 without corresponding known pixel level blockage annotation data 905 is processed via the neural network 902 in the same way as images with known pixel level blockage annotation data 905, thus generating pixel level blockage information 904. Because the image 901 in such an example is assumed not to have known pixel level blockage annotation data 905, comparison 906 may not be possible. Instead, the pixel level blockage 904 output by the neural network 902 is converted to output binary blockage data 910 via a conversion function. Illustratively, the conversion function may represent a thresholding, such that if output pixel level blockage data 904 satisfies the threshold, then output binary blockage data 910 is true. The threshold may be set to an appropriate value, e.g., commensurate with an intended threshold of a human operator who has manually generated known binary blockage data 908. Accordingly, the output binary blockage data 910 of the neural network 902 can represent the network 902's estimation whether a human operator would tag the input image 901 as blocked. Thereafter, this output binary blockage data 910 is compared to the known binary blockage data 908 at comparison 912, which may for example represent a loss function of the network 902. A result of this comparison 912 is then used to modify the network 902 such that the output binary blockage data 910 is guided to match the known binary blockage data 908, thus training the network 902.

In practice, training of the neural network 902 may occur by passing multiple images 901 through the architecture 900, including both images with known pixel level blockage data 907 and images 901 with known binary blockage data 908. In this manner, a trained network 902 is generated. Thereafter, during inference, the elements indicated by box 914 may be used to generate output pixel level blockage data 904 from new, non-training data corresponding to an image 901, which may lack both known pixel level blockage data 907 and known binary blockage data 908. Nevertheless, the network 902 may enable a device, such as a processor within an AV 100, to generate output pixel level blockage data 904 for such an input image 901. Accordingly, a device implementing the network 902 can replicate the subjective assessment of a human via an objective assessment, determining what portions of an image are blocked, and potentially to what extent each portion is blocked. This, in turn, can enable more accurate and safe operation of a device relying on sensor data that generates images 901, such as an AV 100.

Example Synthetic Partial Blockage Training Data Set Generation Routine

Figure 10:
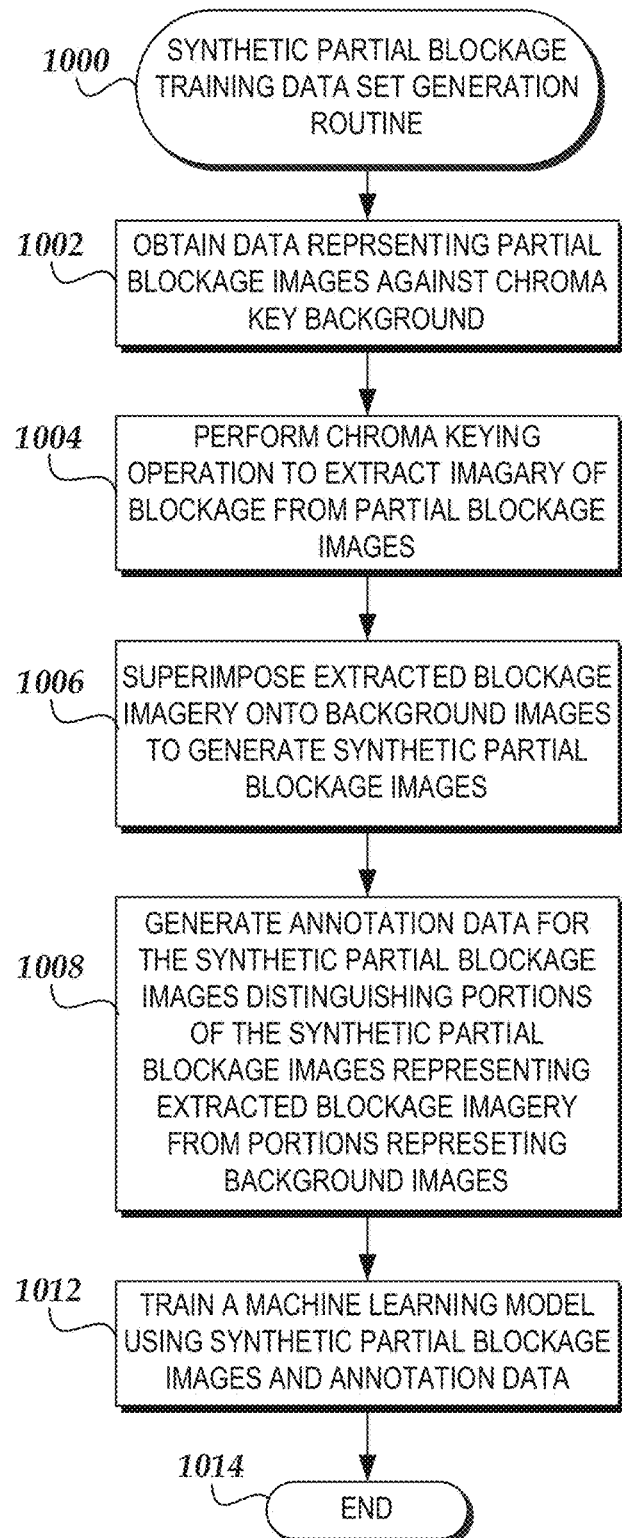
FIG. 10 depicts an example routine for generation of a synthetic partial blockage training data set.

FIG. 10 is a flow chart depicting an example routine 1000 for generation of a synthetic partial blockage training data set. The routine 1000 may be implemented, for example, by a computing system 206 of FIG. 2.

The routine 1000 begins at block 1002, where the computing system 206 obtains data representing partial blockage images against a chroma key background. The images may illustratively be captured by an imaging system, such as the system 700 of FIG. 7. Each image can depict a partial blockage (e.g., road debris, water, mud, condensation, etc.) in front of one or more chroma key backgrounds, such as a green screen. The size, shape, orientation, and type of the partial blockages may vary among the images. For example, the size, shape, orientation, and type of blockages within the obtained data may be selected to provide a representative sample of partial blockages that might be experience during operation of a target device, such as an autonomous vehicle. The number of blockages may vary among images. For example, some images may depict a single item constituting blockage, while others may depict multiple items or different types of blockage in different portions of the image. Lighting of the blockage within images can also be varied in intensity, position and color to simulate the look of the blockage during different times of day and/or during specific types of weather. In some embodiments, the blockage may be subjected to wind effects during image capture to simulate movement of the blockage. Movement of the blockage may cause motion blur in the image, which can create different transparency effects in the resulting image. Further, the chroma key background may vary among the images.

At block 1004, the computing system 206 performs a chroma keying operation to extract imagery of the blockage from the images. The chroma keying operation illustratively acts to remove all of a color corresponding to the relevant chroma key background for each image, thereby leaving just the imagery of the blockage item. The chroma keying operation thus enables the computing system 206 to distinguish between pixels constituting blockage (those not removed by the chroma keying operation) and those constituting background.

In some embodiments, the chroma keying operation may account for partial transparency of blockage. For example, a translucent blockage may partially but not completely block the chroma key background. The chroma keying operation can thus set a partial transparency for pixels representing partially transparent blockage. In one example, the chroma keying operation assumes that a pixel color in a partial blockage image is a weighted average of the chroma key background color and the blockage color, and thus sets a color and transparency value for the pixel based on a difference between the pixel color, the blockage color, and the background color (e.g., such that the background color is removed and the pixel assumes the color of the blockage with a transparency value determined according to how closely the pixel color matches the chroma key background color versus the blockage color).

At block 1006, the computing system 206 superimposes the extracted imagery of the blockage on one or more background images to generate synthetic partial blockage images. In some embodiments, the extracted imagery is used to create a texture. The texture can then be applied to an area of the image identified in the chroma keying operation as corresponding to the blockage. In some embodiments, a size/scale and/or orientation of the blockage can be changed prior to superimposing the imagery of the blockage on the background images to create a broader variety of synthetic partial blockage images. For example, the blockage may be made larger to constitute greater blockage, or smaller to constitute lesser blockage. Each extracted blockage imagery may be superimposed on a background image multiple times, for example with varying size or orientation. Moreover, each extracted blockage imagery may be superimposed on multiple different background images. In this manner, a wide variety of synthetic partial blockage images can be generated from a small number of captured partial blockage images.

In addition, at block 1008, the computing system 206 generates annotation data for each synthetic partial blockage image, the annotation data distinguishing portions of each synthetic partial blockage image that constitute blockage from portions that represent the background images. Illustratively, the annotation data may identify individual pixels of each synthetic blockage image that correspond to the imagery extracted at block 1004 (e.g., those pixels that were not removed during the chroma key operation). Conversely, the annotation data may identify pixels corresponding to the background image as constituting background, rather than blockage. In some instances, the annotation data may further indicate transparency for the blockage, such as by associating an opacity value with each pixel identified as blockage. As noted below, the annotation data may thus provide high granularity labels for each synthetic partial blockage image.

At block 1010, the computing system 206 uses the annotation data and synthetic partial blockage images to train a machine learning model. For example, the synthetic partial blockage images may be passed through a convolutional neural network to train the network to identify partial blockages within imagery. As noted above, training a machine learning model to produce accurate results may require large amounts of data. Accordingly, the ability of the routine 1000 to produce a wide variety of synthetic partial blockage images from a limited set of captured partial blockage images can be beneficial in conducting training.

Figure 11:
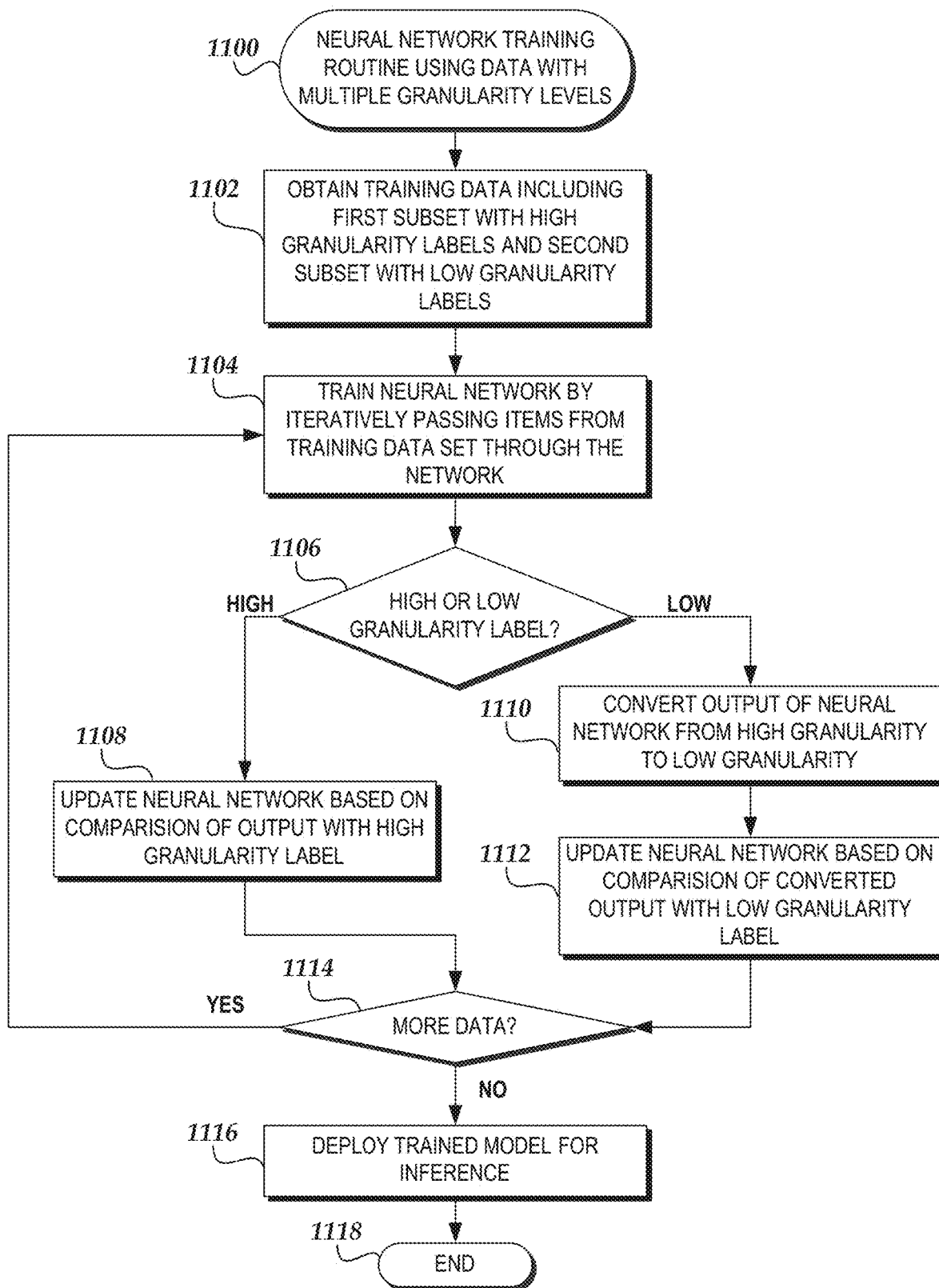
FIG. 11 depicts an example routine for training a neural network with training data having multiple granularity levels.

As discussed above, in some instances training a machine learning model based solely on synthetic data may be undesirable. For example, the model may overfit to synthetic data, such as by learning to distinguish between synthetic and non-synthetic images. This overfitting can render the model inaccurate during use in non-synthesized environments (which may be the desired deployment environment). Accordingly, in some embodiments, the training at block 1012 may include training a model on a combination of synthetic data, such as that generated during implementation of the routine 1000, and non-synthetic data, such as manually annotated blockage data. In some such instances, non-synthetic data may be associated with lower granularity annotations than the synthetic data. For example, rather than having pixel-level annotations, non-synthetic data may be manually classified with a binary or other non-pixel-level annotation. One example routine 1100 for training a neural network with training data having multiple granularity levels is shown in FIG. 11. Accordingly, implementation of block 1012 may include implementation of the routine 1100 of FIG. 11.

As noted above, FIG. 11 depicts an example routine 1100 for training a neural network, such as a convolutional neural network, with training data having multiple granularity levels. The routine 1100 may be implemented, for example, by a computing system 206 of FIG. 2. Illustratively, the routine 1100 may be used to train a model enabling an autonomous vehicle to identify portions of two-dimensional sensor data that constitute blockage of the sensor, thus enabling more accurate and safer operation of the vehicle.

The routine 1100 begins at block 1102, where the computing system 206 obtains training data including both data with high granularity labels and data with low granularity labels. The data may for example represent 2D imagery, such as camera imagery. The high granularity labels may indicate specific portions of the imagery (if any) that constitute a feature that the network is to be trained to distinguish, such as blockage. While blockage is one example of a feature that a neural network may be trained to distinguish, other features are possible. For example, the routine 1100 may be used to train a model to distinguish the presence or absence of other depictions within imagery, such as pedestrians, types of objects, etc. The low granularity labels can similarly indicate whether the feature is present in a corresponding image, but do so at a lower granularity than the high granularity labels. In one embodiment, the high granularity labels are pixel-level annotations indicating which pixels of the image correspond to the feature (or conversely which do not), while the low granularity labels do not provide pixel-level annotations and instead provide lower granularity annotations, such as regional annotations (e.g., which half, quartile, etc. of the image includes imagery) or binary annotations (e.g., indicating a presence or absence of a feature within an image). In another embodiment, the high granularity labels are regional annotations, while the low granularity labels are binary annotations.

Thereafter, the computing system 206 trains the neural network for high granularity output, such that the network, once trained, can provide an output indicating which portions of a given input constitute a feature that the network is trained to detect, with a granularity equal to that of the training data with high granularity labels. For example, where the high granularity portion of the input data set provides pixel-level annotations of blockage, the network can be trained to output pixel-level annotations of blockage given an input image including some blockage.

Training the neural network illustratively includes, at block 1104, iteratively feeding items from the training data set through the network and updating weights of the network based on a comparison between an output of the network and a label for the individual data item. For each item from the training data set, the routine 1100 then varies according to whether the item is associated with a high or low granularity label, as shown at block 1106.

In the case that the item is associated with a high granularity label, the routine 1100 proceeds to block 1108, where the neural network is updated based on a comparison of the output of the network with the high granularity label. For example, the system 206 may implement back propagation to update weights of the network based on a difference between the output of the network, corresponding to predicted values for the high granularity label, and actual values for the high granularity label. Over many iterations, the network can thus be trained to accurately predict values for high granularity labels.

In the case that the item is associated with a low granularity label, the routine 1100 proceeds to block 1110, where the output of the network is converted from high granularity to low granularity. To implement conversion, the computing system 206 may pass the high granularity output through a conversion function, which may be tailored to the particular data in the training data set. For example, where the low granularity data is binary data, the conversion function may determine whether a threshold amount of the output indicates a given feature (e.g., whether a threshold number of pixels, regions, etc., constitute blockage), and output a "true" value when the threshold is satisfied, or conversely a "false" value when the threshold is not satisfied. Where the low granularity data is a regional indication of a feature, the conversion function may similarly evaluate a portion of the output corresponding to that region against a threshold, such as by outputting a "present" indicator of the feature in a region when at least a threshold of the region is indicated as possessing the feature in the high granularity output. In one embodiment, the conversion function may itself be a machine learning model. For example, the conversion function machine learning model may be initialized with a set of weights to act as a simple thresholding function while the neural network for generating high granularity output indicative of a given feature is trained. When sufficient accuracy is achieved at the neural network, the weights of the neural network may be held constant while the conversion function model is trained. In one instance, the neural network and conversion function machine learning model (which may itself be a neural network) may be trained concurrently, such as by iteratively holding one of the two models constant while the other is trained at each iteration. Accordingly, a high granularity output of the network is converted into a lower granularity, matching a granularity for a label of the item.

Thereafter, at block 1112, the network is updated based on a comparison of the converted output of the network with the low granularity label. For example, the system 206 may implement back propagation to update weights of the network based on a difference between the converted output of the network, corresponding to predicted values for the low granularity label, and actual values for the low granularity label. Over many iterations, the network can thus be trained to accurately predict values for high granularity labels that, when converted, match a low granularity label assigned to the item.

The routine 1100 then varies according to whether more data exists within the training data set, as shown at block 1114. If so, the routine 1100 returns to block 1104, where additional items from the training data set are used to update weights of the network, as described above. If no further training data is present in the data set, the routine 1100 proceeds to block 1116, where the trained model can be deployed, output, or transmitted to a destination computing device for use during inference. For example, a model trained to provide pixel-level blockage indications for 2D imagery may be deployed output, or transmitted to an autonomous vehicle (e.g., implemented by a processor 146 of FIG. 1 based on sensor data obtain from a camera 112) to enable the vehicle to detect accurately the presence and extent of blockage of a sensor and take appropriate corrective action should such blockage occur. Such corrective action may include, for example, cleaning of a sensor (e.g., via a wiper mechanism or the like), notification to an operator, execution of a minimum risk maneuver such as slowing down and exiting a roadway, or the like. Thus, a neural network, as trained via the routine 1100, can provide for safer and more accurate use of sensor data in autonomous vehicles or other contexts.

Various example embodiments of the disclosure can be described by the following clauses:

Clause 1. A computer-implemented method implemented by one or more hardware processors, the method comprising:
obtaining, using the one or more hardware processors, data representing partial blockage images, each partial blockage image depicting blockage in front of a chroma key background;
generating, using the one or more hardware processors, a training data set including a plurality of synthetic partial blockage images, wherein generating the training data set comprises, for each synthetic partial blockage image of the synthetic partial blockage images:
performing a chroma keying operation to extract imagery of a
blockage from a partial blockage image of the partial blockage images;
superimposing the extracted imagery of the blockage on a
background image to generate the synthetic partial blockage image; and
generating annotation data for the synthetic partial blockage image,
the annotation data distinguishing portions of the synthetic partial blockage image representing the extracted imagery of the blockage from portions of the synthetic partial blockage image representing the background image; and
training, using the one or more hardware processors, a neural network using the plurality of synthetic partial blockage images to identify portions of input image data, corresponding to data from a sensor of an autonomous vehicle, that represent blockage on the sensor of the autonomous vehicle.

Clause 2. The computer-implemented method as recited in clause 1, wherein the annotation data identifies pixels of the background image being blocked by the superimposed extracted imagery of the blockage.

Clause 3. The computer-implemented method as recited in any of clauses 1-2, wherein the chroma key background is a green screen.

Clause 4. The computer-implemented method as recited in any of clauses 1-3, wherein the blockage is matter adhered to a lens of a imaging device capturing the partial blockage images.

Clause 5. The computer-implemented method as recited in any of clauses 1-4, wherein the neural network is a convolution neural network.

Clause 6. The computer-implemented method as recited in any of clauses 1-5, further comprising selecting the background image randomly from a plurality of background images captured by a vehicle-mounted imaging device while a vehicle carrying the vehicle-mounted imaging device navigates a roadway.

Clause 7. The computer-implemented method as recited in clause 6, wherein the vehicle-mounted imaging device is substantially the same as an imaging device used to capture the partial blockage images.

Clause 8. The computer-implemented method as recited in any of clauses 1-7, wherein performing the chroma keying operation comprises associating portions of the extracted imagery of the blockage with transparency values.

Clause 9. The computer-implemented method as recited in any of clauses 1-8, wherein generating the training data set comprises, for at least one partial blockage image of the partial blockage images, rotating the extracted imagery of the blockage.

Clause 10. The computer-implemented method as recited in any of clauses 1-9, wherein, for at least one synthetic partial blockage image of the partial blockage images, the extracted imagery of the blockage depicts two blockage portions, and wherein generating the training data set comprises, for the at least one synthetic partial blockage image:
rotating a first blockage portion of the extracted imagery a first amount; and
rotating a second blockage portion the extracted imagery a second amount different than the first amount.

Clause 11. The computer-implemented method as recited in clause 10, further comprising adjusting a size of the first blockage portion the extracted imagery of the blockage item by a first amount and adjusting a resolution of a second subset of the extracted imagery of the blockage item by a second amount prior to superimposing the extracted imagery over the different background images.

Clause 12. The computer-implemented method as recited in clause 1, wherein performing the chroma keying operation comprises extracting any imagery with a transparency value below a threshold value.

Clause 13. The computer-implemented method as recited in clause 13, wherein the threshold value is at least 90%.

Clause 14. The computer-implemented method as recited in clause 1, wherein, for at least one synthetic partial blockage image of the partial blockage images, generating the training data set comprises superimposing both the extracted imagery of the blockage and imagery of a second blockage on the background image to generate the synthetic partial blockage image.

Clause 15. The computer-implemented method as recited in clause 14 further comprising performing a chroma keying operation to extract imagery of the second blockage from at least one of the partial blockage images.

Clause 16. The computer-implemented method as recited in any of clauses 1-15, wherein the partial blockage images comprise at least two images depicting a given blockage at different distances from a device capturing the at least two images.

Clause 17. The computer-implemented method as recited in any of clauses 1-16, wherein a first subset of the partial blockage images are captured at a first lighting level and a second subset of the partial blockage images are captured at a second lighting level different than the first lighting level.

Clause 18. The computer-implemented method as recited in clause 17, wherein a light source used to illuminate the blockage is located in a first position to create the first lighting level and a second position different from the first position to create the second lighting level.

Clause 19. The computer-implemented method as recited in any of clauses 18, wherein a quantity of light emitted by the light source is greater for the first lighting level than it is for the second lighting level.

Clause 20. The computer-implemented method as recited in clause 18, wherein the light source is a directional light source oriented in a first direction and emitting a first quantity of light to create the first lighting level and wherein the light source is oriented in a second direction and emitting a second amount of light to create the second lighting level.

Clause 21. A system comprising:
  a data store including computer-executable instructions; and
  a processor configured to execute the computer-executable instructions, wherein execution of the computer-executable instructions causes the system to:
    obtain data representing partial blockage images, each partial blockage image depicting blockage in front of a chroma key background;
    generate a training data set including a plurality of synthetic partial blockage images, at least by, for each synthetic partial blockage image of the synthetic partial blockage images:
      performing a chroma keying operation to extract imagery of a blockage from a partial blockage image of the partial blockage images;
      superimposing the extracted imagery of the blockage on a background image to generate the synthetic partial blockage image; and
      generating annotation data for the synthetic partial blockage image, the annotation data distinguishing portions of the synthetic partial blockage image representing the extracted imagery of the blockage from portions of the synthetic partial blockage image representing the background image; and
    train a neural network using the plurality of synthetic partial blockage images to identify portions of input image data, corresponding to data from a sensor of an autonomous vehicle, that represent blockage on the sensor of the autonomous vehicle.

Clause 22. One or more non-transitory computer-readable media comprising computer-executable instructions that, when executed by a computing system comprising a processor, causes the computing system to:
  obtain data representing partial blockage images, each partial blockage image depicting blockage in front of a chroma key background;
  generate a training data set including a plurality of synthetic partial blockage images, at least by, for each synthetic partial blockage image of the synthetic partial blockage images:
    performing a chroma keying operation to extract imagery of a blockage from a partial blockage image of the partial blockage images;
    superimposing the extracted imagery of the blockage on a background image to generate the synthetic partial blockage image; and
    generating annotation data for the synthetic partial blockage image, the annotation data distinguishing portions of the synthetic partial blockage image representing the extracted imagery of the blockage from portions of the synthetic partial blockage image representing the background image; and
  train a neural network using the plurality of synthetic partial blockage images to identify portions of input image data, corresponding to data from a sensor of an autonomous vehicle, that represent blockage on the sensor of the autonomous vehicle.

Various additional example embodiments of the disclosure can be described by the following additional clauses:

Clause 1. A computer-implemented method implemented by one or more hardware processors, comprising:
  training, using the one or more hardware processors, a neural network to output data at a first granularity, higher than a second granularity, based on a training data set including a first subset of items labeled at the first granularity and a second subset of items labeled at the second granularity lower than the first granularity, wherein training the neural network comprises:
    for each item within the first subset of items labeled at the first granularity higher than the second granularity:
      passing the item labeled at the first granularity through the neural network to generate output corresponding to the item labeled at the first granularity; and
      updating weights of the neural network based on a comparison between the output corresponding to the item labeled at the first granularity and a label of the item corresponding to the first granularity;
    for each item within the second subset of items labeled at the second granularity lower than the first granularity:
      passing the item labeled at the second granularity through the neural network to generate output corresponding to the item labeled at the second granularity;
      passing the output corresponding to the item labeled at the second granularity through a conversion function to convert the output corresponding to the item labeled at the second granularity into a converted output at the second granularity; and
      updating weights of the neural network based on a comparison between converted output at the second granularity and a label of the item corresponding to the second granularity.

Clause 2. The computer-implemented method of clause 1, wherein the neural network is a convolutional neural network.

Clause 3. The computer-implemented method of any of clauses 1-2, wherein the first subset of items labeled at the first granularity are images with pixel-level annotations identifying locations of a feature within images of the first subset.

Clause 4. The computer-implemented method of clause 3, wherein the second subset of items labeled at the second granularity are images with at least one of non-pixel-level regional annotations identifying locations of the feature within the images of the second subset or binary annotations identifying whether the feature is present within the images of the second subset.

Clause 5. The computer-implemented method of any of clauses 1-2, wherein the first subset of items labeled at the first granularity are images with non-pixel-level regional annotations identifying locations of a feature within the images of the second subset, and wherein the second subset of items labeled at the second granularity are images with binary annotations identifying whether the feature is present within the images of the second subset.

Clause 6. The computer-implemented method of any of clauses 3-5, wherein feature is a sensor blockage.

Clause 7. The computer-implemented method of any of clauses 1-6, wherein the conversion function is a thresholding function converting a label of the first granularity to a label of the second granularity.

Clause 8. The computer-implemented method of clause 7, wherein the conversion function is machine learning model.

Clause 9. The computer-implemented method of clause 8, wherein the machine learning model is a second neural network.

Clause 10. The computer-implemented method of any of clauses 8-9, wherein the machine learning model is trained concurrently with the neural network.

Clause 11. The computer-implemented method of any of clauses 1-10, wherein the second subset of items labeled at the second granularity lower that the first granularity includes manually annotated items.

Clause 12. The computer-implemented method of any of clauses 1-11, wherein the first subset of items labeled at the first granularity higher that the second granularity includes programmatically generated synthetic items.

Clause 13. The computer-implemented method of clause 12 further comprising generating the programmatically generated synthetic items, wherein generating the programmatically generated synthetic items comprises, for each of the programmatically generated synthetic items:
  performing a chroma keying operation to extract imagery of a feature from a partial feature image;
  superimposing the extracted imagery of the feature on a background image to generate the programmatically generated synthetic item; and
  generating annotation data for the programmatically generated synthetic items, the annotation data distinguishing portions of the programmatically generated synthetic items representing the extracted imagery of the feature from portions programmatically generated synthetic items representing the background image.

Clause 14. The computer-implemented method of any of clauses 1-13, further comprising deploying the neural network subsequent to training to conduct inference against inputs and provide outputs at the first granularity.

Clause 15. The computer-implemented method of clause 14, wherein deploying the neural network subsequent to training to conduct inference against inputs and provide outputs at the first granularity comprises deploying the neural network to an autonomous vehicle.

Clause 16. The computer-implemented method of clause 15, wherein deploying the neural network to an autonomous vehicle enables the autonomous vehicle to identify portions of input image data, corresponding to data from a sensor of the autonomous vehicle, that represent blockage on the sensor of the autonomous vehicle.

Clause 17. A system comprising:
  a data store including computer-executable instructions; and
  a processor configured to execute the computer-executable instructions, wherein execution of the computer-executable instructions causes the system to:
    train a neural network to output data at a first granularity, higher than a second granularity, based on a training data set including a first subset of items labeled at the first granularity and a second subset of items labeled at the second granularity lower than the first granularity, wherein training the neural network comprises:
      for each item within the first subset of items labeled at the first granularity higher than the second granularity:
        passing the item labeled at the first granularity through the neural network to generate output corresponding to the item labeled at the first granularity; and
        updating weights of the neural network based on a comparison between the output corresponding to the item labeled at the first granularity and a label of the item corresponding to the first granularity;
      for each item within the second subset of items labeled at the second granularity lower than the first granularity:
        passing the item labeled at the second granularity through the neural network to generate output corresponding to the item labeled at the second granularity;
        passing the output corresponding to the item labeled at the second granularity through a conversion function to convert the output corresponding to the item labeled at the second granularity into a converted output at the second granularity; and
        updating weights of the neural network based on a comparison between converted output at the second granularity and a label of the item corresponding to the second granularity; and
    store the trained neural network for subsequent deployment to conduct inference against inputs and provide outputs at the first granularity.

Clause 18. The system of clause 17, wherein the first subset of items labeled at the first granularity are images with pixel-level annotations identifying locations of a feature within images of the first subset.

Clause 19. The system of clause 18, wherein the feature is sensor blockage.

Clause 20. The system of any of clauses 17-19, wherein deploying the neural network subsequent to training to conduct inference against inputs and provide outputs at the first granularity comprises deploying the neural network to an autonomous vehicle, wherein deploying the neural network to an autonomous vehicle enables the autonomous vehicle to identify portions of input image data, corresponding to data from a sensor of the autonomous vehicle, that represent sensor blockage on the sensor of the autonomous vehicle.

Clause 21. One or more non-transitory computer-readable media comprising computer-executable instructions that, when executed by a computing system comprising a processor, causes the computing system to:
  train a neural network to output data at a first granularity, higher than a second granularity, based on a training data set including a first subset of items labeled at the first granularity and a second subset of items labeled at the second granularity lower than the first granularity, wherein training the neural network comprises:
for each item within the first subset of items labeled at the first granularity higher than the second granularity:
passing the item labeled at the first granularity through the neural network to generate output corresponding to the item labeled at the first granularity; and
updating weights of the neural network based on a comparison between the output corresponding to the item labeled at the first granularity and a label of the item corresponding to the first granularity;
for each item within the second subset of items labeled at the second granularity lower than the first granularity:
passing the item labeled at the second granularity through the neural network to generate output corresponding to the item labeled at the second granularity;
passing the output corresponding to the item labeled at the second granularity through a conversion function to convert the output corresponding to the item labeled at the second granularity into a converted output at the second granularity; and
updating weights of the neural network based on a comparison between converted output at the second granularity and a label of the item corresponding to the second granularity; and
store the trained neural network for subsequent deployment to conduct inference against inputs and provide outputs at the first granularity.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the claims, and what is intended by the applicants to be the scope of the claims, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A computer-implemented method implemented by one or more hardware processors, comprising:
training, using the one or more hardware processors, a neural network to output data at a first granularity, higher than a second granularity, based on a training data set comprising a plurality of images, wherein the plurality of images includes a first subset of images labeled at the first granularity and a second subset of images labeled at the second granularity lower than the first granularity, wherein a label corresponding to the first granularity designates a feature with respect to a more specific portion of an image of the plurality of images than a label corresponding to the second granularity, and wherein training the neural network comprises:
for at least one first image of the first subset of images labeled at the first granularity higher than the second granularity:
passing the at least one first image labeled at the first granularity through the neural network to generate output corresponding to the at least one first image labeled at the first granularity, wherein the output is associated with the first granularity; and
updating weights of the neural network based on a comparison between the output corresponding to the at least one first image labeled at the first granularity and a label of the at least one first image, wherein the label of the at least one first image corresponds to the first granularity; and
for at least one second image of the second subset of images labeled at the second granularity lower than the first granularity:
passing the at least one second image labeled at the second granularity through the neural network to generate output corresponding to the at least one second image labeled at the second granularity, wherein the output is associated the first granularity;
passing the output corresponding to the at least one second image labeled at the second granularity through a conversion function to convert the output corresponding to the at least one second image labeled at the second granularity into a converted output, wherein the converted output is associated with the second granularity; and
updating weights of the neural network based on a comparison between the converted output associated with the second granularity and a label of the at least one second image, wherein the label of the at least one second image corresponds to the second granularity.

2. The computer-implemented method of claim 1, wherein the neural network is a convolutional neural network.

3. The computer-implemented method of claim 1, wherein the first subset of images labeled at the first granularity are images with pixel-level annotations identifying locations within images of the first subset of images representing the feature.

4. The computer-implemented method of claim 3, wherein the second subset of images labeled at the second granularity are images with at least one of non-pixel-level regional annotations identifying locations within images of the second subset of images representing the feature or binary annotations identifying whether the feature is present within the images of the second subset of images.

5. The computer-implemented method of claim 1, wherein the first subset of images labeled at the first granularity are images with non-pixel-level regional annotations identifying locations within images of the first subset of images representing the feature, and wherein the second subset of images labeled at the second granularity are images with binary annotations identifying whether the feature is present within the images of the second subset of images.

6. The computer-implemented method of claim 3, wherein the feature is a sensor blockage.

7. The computer-implemented method of claim 1, wherein the conversion function is a thresholding function converting an input label of the first granularity to an output label of the second granularity.

8. The computer-implemented method of claim 7, wherein the conversion function is machine learning model.

9. The computer-implemented method of claim 8, wherein the machine learning model is a second neural network.

10. The computer-implemented method of claim 8, wherein the machine learning model is trained concurrently with the neural network.

11. The computer-implemented method of claim 1, wherein the second subset of images labeled at the second granularity lower that the first granularity includes manually annotated images.

12. The computer-implemented method of claim 1, wherein the first subset of images labeled at the first granularity higher that the second granularity includes programmatically generated synthetic partial feature images.

13. The computer-implemented method of claim 12 further comprising generating the programmatically generated synthetic partial feature images, wherein generating the programmatically generated synthetic partial feature images comprises, for each of the programmatically generated synthetic partial feature images:
performing a chroma keying operation to extract imagery of the feature from a partial feature image;
superimposing the extracted imagery of the feature on a background image to generate the programmatically generated synthetic partial feature image; and
generating annotation data for the programmatically generated synthetic partial feature image, the annotation data associated with a label, for the programmatically generated synthetic partial feature image, corresponding to the first granularity, the label for the programmatically generated synthetic partial feature image distinguishing portions of the programmatically generated synthetic partial feature image representing the extracted imagery of the feature from portions of the programmatically generated synthetic partial feature image representing the background image.

14. The computer-implemented method of claim 1, further comprising deploying the neural network subsequent to training to conduct inference against inputs and provide outputs at the first granularity.

15. The computer-implemented method of claim 14, wherein deploying the neural network subsequent to training to conduct inference against inputs and provide outputs at the first granularity comprises deploying the neural network to an autonomous vehicle.

16. The computer-implemented method of claim 15, wherein deploying the neural network to an autonomous vehicle enables the autonomous vehicle to identify portions of input image data, corresponding to data from a sensor of the autonomous vehicle, that represent blockage on the sensor of the autonomous vehicle.

17. A system comprising:
a data store including computer-executable instructions; and
a processor configured to execute the computer-executable instructions, wherein execution of the computer-executable instructions causes the system to:
train a neural network to output data at a first granularity, higher than a second granularity, based on a training data set comprising a plurality of images, wherein the plurality of images includes a first subset of images labeled at the first granularity and a second subset of images labeled at the second granularity lower than the first granularity, wherein a label corresponding to the first granularity designates a feature with respect to a more specific portion of an image of the plurality of images than a label corresponding to the second granularity, and wherein to train the neural network, execution of the computer-executable instructions causes the system to:
for at least one first image of the first subset of images labeled at the first granularity higher than the second granularity:
passing the at least one first image labeled at the first granularity through the neural network to generate output corresponding to the at least one first image labeled at the first granularity, wherein the output is associated with the first granularity; and
updating weights of the neural network based on a comparison between the output corresponding to the at least one first image labeled at the first granularity and a label of the at least one first image, wherein the label of the at least one first image corresponds to the first granularity; and
for at least one second image of the second subset of images labeled at the second granularity lower than the first granularity:
passing the at least one second image labeled at the second granularity through the neural network to generate output corresponding to the at least one second image labeled at the second granularity, wherein the output is associated the first granularity;
passing the output corresponding to the at least one second image labeled at the second granularity through a conversion function to convert the output corresponding to the at least one second image labeled at the second granularity into a converted output, wherein the converted output is associated with the second granularity; and
updating weights of the neural network based on a comparison between the converted output associated with the second granularity and a label of the at least one second image, wherein the label of the at least one second image corresponds to the second granularity; and
store the trained neural network for subsequent deployment to conduct inference against inputs and provide outputs at the first granularity.

18. The system of claim 17, wherein the first subset of images labeled at the first granularity are images with pixel-level annotations identifying locations of the feature within images of the first subset of images.

19. The system of claim 18, wherein the feature is sensor blockage.

20. The system of claim 17, wherein deploying the neural network subsequent to training to conduct inference against inputs and provide outputs at the first granularity comprises deploying the neural network to an autonomous vehicle, wherein deploying the neural network to an autonomous vehicle enables the autonomous vehicle to identify portions of input image data, corresponding to data from a sensor of the autonomous vehicle, that represent sensor blockage on the sensor of the autonomous vehicle.

21. One or more non-transitory computer-readable media comprising computer-executable instructions that, when executed by a computing system comprising a processor, causes the computing system to:
train a neural network to output data at a first granularity, higher than a second granularity, based on a training data set including a first subset of images labeled at the first granularity and a second subset of images labeled at the second granularity lower than the first granularity, wherein a label corresponding to the first granularity designates a feature with respect to a more specific portion of an image than a label corresponding to the second granularity, and wherein to train the neural network, the computer-executable instructions, when executed by the computing system, cause the computing system to:

for at least one first image of the first subset of images labeled at the first granularity higher than the second granularity:

passing the at least one first image labeled at the first granularity through the neural network to generate output corresponding to the at least one first image labeled at the first granularity, wherein the output is associated with the first granularity; and updating weights of the neural network based on a comparison between the output corresponding to the at least one first image labeled at the first granularity and a label of the at least one first image, wherein the label of the at least one first image corresponds to the first granularity; and for at least one second image of the second subset of images labeled at the second granularity lower than the first granularity:

passing the at least one second image labeled at the second granularity through the neural network to generate output corresponding to the at least one second image labeled at the second granularity, wherein the output is associated the first granularity;

passing the output corresponding to the at least one second image labeled at the second granularity through a conversion function to convert the output corresponding to the at least one second image labeled at the second granularity into a converted output, wherein the converted output is associated with the second granularity; and updating weights of the neural network based on a comparison between the converted output associated with the second granularity and a label of the at least one second image, wherein the label of the at least one second image corresponds to the second granularity; and store the trained neural network for subsequent deployment to conduct inference against inputs and provide outputs at the first granularity.

\* \* \* \* \*